(12) United States Patent
Pan et al.

(10) Patent No.: US 9,781,312 B2
(45) Date of Patent: *Oct. 3, 2017

(54) INTERCHANGEABLE MOUNTING PLATFORM

(71) Applicant: SZ DJI TECHNOLOGY Co., LTD, Shenzhen (CN)

(72) Inventors: Paul Pan, Shenzhen (CN); Xifeng Zhao, Shenzhen (CN); Tao Zhao, Shenzhen (CN)

(73) Assignee: SZ DJI TECHNOLOGY CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,210

(22) Filed: Feb. 1, 2016

(65) Prior Publication Data

US 2016/0144961 A1    May 26, 2016

Related U.S. Application Data

(63) Continuation of application No. 14/463,558, filed on Aug. 19, 2014, now Pat. No. 9,280,038, which is a
(Continued)

(51) Int. Cl.
*H04N 5/225* (2006.01)
*G03B 17/56* (2006.01)
(Continued)

(52) U.S. Cl.
CPC ............ *H04N 5/2251* (2013.01); *A45F 5/10* (2013.01); *B64C 39/024* (2013.01); *B64D 1/08* (2013.01);
(Continued)

(58) Field of Classification Search
CPC .......................... G03B 17/561; G03B 17/563
See application file for complete search history.

(56) References Cited

U.S. PATENT DOCUMENTS

| 6,542,181 | B1 | 4/2003 | Houska et al. |
| 7,000,883 | B2 | 2/2006 | Mercadal et al. |

(Continued)

FOREIGN PATENT DOCUMENTS

| CN | 200951833 Y | 9/2007 |
| CN | 102353365 A | 2/2012 |

(Continued)

OTHER PUBLICATIONS

U.S. Appl. No. 15/092,959, filed Apr. 7, 2016, Pan et al.
(Continued)

*Primary Examiner* — W B Perkey
(74) *Attorney, Agent, or Firm* — Wilson Sonsini Goodrich & Rosati

(57) ABSTRACT

A platform for interchangeably mounting a payload to a base support is provided. In one aspect, the platform comprises: a support assembly configured to be releasably coupled to a payload via a first coupling and configured to control a spatial disposition of the payload; and a mounting assembly configured to be releasably coupled via a second coupling to a plurality of types of base supports selected from at least two of the following: an aerial vehicle, a handheld support, or a base adapter mounted onto a movable object.

21 Claims, 37 Drawing Sheets

Related U.S. Application Data continuation of application No. PCT/CN2014/076420, filed on Apr. 28, 2014.

(51) Int. Cl.

| | | |
|---|---|---|
| *B64D 47/08* | (2006.01) | |
| *F16M 13/04* | (2006.01) | |
| *F16M 13/02* | (2006.01) | |
| *B64C 39/02* | (2006.01) | |
| *F16M 11/12* | (2006.01) | |
| *H04N 5/232* | (2006.01) | |
| *A45F 5/10* | (2006.01) | |
| *B64D 1/08* | (2006.01) | |
| *F16M 11/10* | (2006.01) | |
| *F16M 11/20* | (2006.01) | |
| *G03B 15/00* | (2006.01) | |

(52) U.S. Cl.
CPC ............ *B64D 47/08* (2013.01); *F16M 11/105* (2013.01); *F16M 11/12* (2013.01); *F16M 11/123* (2013.01); *F16M 11/2064* (2013.01); *F16M 13/022* (2013.01); *F16M 13/04* (2013.01); *G03B 15/006* (2013.01); *G03B 17/561* (2013.01); *G03B 17/566* (2013.01); *H04N 5/2253* (2013.01); *H04N 5/23203* (2013.01); *H04N 5/23216* (2013.01); *B64C 2201/127* (2013.01)

(56) References Cited

U.S. PATENT DOCUMENTS

| | | | |
|---|---|---|---|
| 8,087,315 | B2 | 1/2012 | Goossen et al. |
| 8,162,263 | B2 | 4/2012 | Wong et al. |
| D720,833 | S | 1/2015 | Whitton et al. |
| 9,280,038 | B1 | 3/2016 | Pan et al. |
| 2005/0185089 | A1 | 8/2005 | Chapman |
| 2007/0050139 | A1 | 3/2007 | Sidman |
| 2008/0210025 | A1 | 9/2008 | Goossen et al. |
| 2009/0003822 | A1 | 1/2009 | Tyner |
| 2009/0257741 | A1 | 10/2009 | Greb et al. |
| 2009/0317071 | A1 | 12/2009 | David |
| 2010/0079101 | A1 | 4/2010 | Sidman |
| 2010/0266272 | A1 | 10/2010 | Holway et al. |
| 2012/0305741 | A1 | 12/2012 | Sapir |
| 2012/0316685 | A1 | 12/2012 | Pettersson |
| 2013/0005401 | A1 | 1/2013 | Rosenhan et al. |
| 2013/0048792 | A1 | 2/2013 | Szarek et al. |
| 2013/0050487 | A1 | 2/2013 | Omer et al. |
| 2013/0343743 | A1 | 12/2013 | Yen |
| 2014/0037281 | A1 | 2/2014 | Carney |
| 2014/0049643 | A1 | 2/2014 | Segerstrom et al. |
| 2014/0270743 | A1 | 9/2014 | Webb et al. |
| 2015/0071627 | A1* | 3/2015 | Hoang ............... F16M 13/00 396/421 |
| 2015/0219982 | A1* | 8/2015 | Aiello ............... G03B 17/563 361/601 |
| 2015/0241713 | A1 | 8/2015 | Laroia et al. |
| 2015/0261070 | A1 | 9/2015 | Feng et al. |
| 2016/0201847 | A1* | 7/2016 | Firchau ............... F16M 11/041 224/567 |
| 2016/0255249 | A1 | 9/2016 | Pan et al. |
| 2017/0089513 | A1 | 3/2017 | Pan et al. |

FOREIGN PATENT DOCUMENTS

| | | |
|---|---|---|
| CN | 202327560 U | 7/2012 |
| CN | 202452054 U | 9/2012 |
| JP | S61113463 U | 7/1986 |
| JP | H07171108 A | 7/1995 |
| JP | 2002154491 A | 5/2002 |
| JP | 2002154491 A | 5/2002 |
| JP | 2006180326 A | 7/2006 |
| JP | 2006180326 A | 7/2006 |
| JP | 2012140101 A | 7/2012 |
| JP | 2012140101 A | 7/2012 |
| WO | WO 2010/078571 A1 | 7/2010 |

OTHER PUBLICATIONS

International search report and written opinion dated Jan. 15, 2015 for PCT/CN2014/076420.

Notice of allowance dated Dec. 21, 2015 for U.S. Appl. No. 14/463,558.

Office action dated Sep. 10, 2015 for U.S. Appl. No. 14/463,558.

U.S. Appl. No. 15/154,740, filed May 13, 2016, Pan et al.

DIY hand-held gimbal for GoPro. Published Jun. 25, 2013. https://www.youtube.com/watch?v=uHFLiGFWpvs.

EQUIP Series Indoor High Resolution True Day/Night IP Dome Camera. NTSC/PAL User Guide. Honeywell. Document 800-07361V3. Nov. 2011. 92 pages.

FeiYu G3 2-Axis Brushless Gimbal Manual for GoPro3. Updated Sep. 26, 2015. 2 pages.

FeiYu G3 2-Axis Brushless Gimbal Manual Phantom Version. Updated Sep. 26, 2015. 2 pages.

FeiYu Tech Product website. G4 Gimbal and others. 2016. http://www.feiyu-tech.cn/products/35/.

Yuneec USA, Inc's Answer to Plaintiffs Complaint, Affirmative Defenses, and Counterclaims Case No. 5:16-cv-00595-BRO(KKx). Filed May 25, 2016. 19 pages.

AbelCine. NAB 2014: Freefly Systems MōVI M15 & Accessories. Published Apr. 8, 2014. 4 pages. Available at https://youtu.be/DWH_prQzewM.

Blade 350qx gimbal mounted. Published Mar. 22, 2014. 2 pages. Available at https://www.youtube.com/watch?v=cHcbIf618Cc ("Tarot Video B").

C520 specification sheet gyro stabilized platform—cinema series. Gyro-Stabilized Systems. Publicly accessible no later than Apr. 18, 2013. 1 page. https://web.archive.org/web/20130516020259/http://gyrostabilizedsystems.com/wp-content/uploads/2013/03/C520-Specification-Sheet.pdf.

Cam OneTec Gravitiy Sports Gimbal. Published Feb. 20 , 2014. 2 pages. Available at https://www.youtube.com/watch?v=t5rfSK8SuvU ("Handheld Video 3").

Detailed Tarot Gimbal install with Pitch control by That HPI Guy. Published Aug. 6, 2013. 4 pages. Available at https://www.youtube.com/watch?v=T8tsSOTwN5s ("Taro/ Video H").

Draganflyer Guardian. Accessed Oct. 17, 2016. 7 pages. Available at www.draganfly.com/products/guardian/overview (Dragonfly Guardian).

Draganflyer X4-P Features. Accessed Oct. 17, 2016. 8 pages. Available at https://www.draganfly.com/products/x4-p/features ("X4-P Features").

Draganflyer X4-P Package. Accessed Oct. 17, 2016. 2 page. Available at https://web.archive.org/web/20130403225821/http://www.draganfly.com/uav-helicopter/draganflyer-x4p/index.php ("Draganflyer").

Draganflyer X4-P Professional Quadcopter Base Model. Accessed Oct. 17, 2016. 8 pages. Available at https://www.solvelight.com/product/draganflyer-x4-p-professional-quadcopter-base-model ("X4 Professional").

FeiYu-Tech G3 Steadycam Gimbal Product page. Publicly accessible at least Mar. 30, 2014. Available at https://web.archive.org/web/20140330235419/http://www.feiyu-tech.com/product-en.php?id=41.

Freefly. Product Page for "Cinestar HL," Publicly accessible no later than Feb. 9, 2014. 1 page. Available at https://web.archive.org/web/20140209044431/http://freeflysystems.com/products/cinestarHL.php ("Cinestar HL").

Freefly. Product Page for "MoVI M5," publicly accessible no later than Feb. 9, 2014. 2 pages. Available at https://web.archive.org/web/20140209043252/http://freeflysystems.com/products/moviM5.php ("MoVI M5").

(56) References Cited

OTHER PUBLICATIONS

Freefly. Product Page for "MoVI Ring,". Accessed Oct. 17, 2016. 1 page. Available at http://store.freeflysystems.com/collections/movi/products/movi-ring ("MoVI Ring").
Freefly. Product Page for "Toad in the Hole Quick Release," Accessed Oct. 17, 2016. 2 pages. Available at http://store.freeflysystems.com/products/toad-in-the-hole-quick-release ("Toad in the Hole Quick Release").
GB200 System Quick Start Manual. NAB 2014 trade show. 2014. 16 pages.
GoPro Hero 3 & 3+ DIY Handheld Gimbal Stabiliser. Published Jan. 27, 2014. 3 pages. Available at https://www.youtube.com/watch?v=5iZFDyy1TLU ("Tarot Video E").
GoPro Mounts. Mounting Accessories page. Publicly accessible no later than Apr. 28, 2013. 4 pages. https://web.archive.org/web/20130428055605/http://gopro.com/camera-mounts?.
Hand held Camera Gimbal test (RUNNING) at Talossa Skate Park. Published Jun. 2, 2013. 3 pages. Available at https://www.youtube.com/watch?v=fi-QdZmhaf0 ("Handheld Video 1").
Handheld Tarot Gimbal Quick Test. Published Apr. 21, 2014. 2 pages. Available at https://www.youtube.com/watch?v=QcBSCywiOY ("Tarot Video D").
Helifilms features and capabilities homepage. Publicly accessible no later than Mar. 1, 2014. 3 pages. https://web.archive.org/web/20140301104828/http://helifilms.com/featuresandcapabilities.html.
HiModel. Conversion mounting plate for Tarot Gimbal to DJI Phantom Quadcopter. Publicly accessible no later than Nov. 7, 2013. 1 page. https://web.archive.org/web/20131107040748/http://www.himodel.com/multi_rotors/Conversion_mounting_plate_for_Tarot_Gimbal_to_DJI_Phantom_Quadcopter.html.
Meeker Aviation Special Ops equipment homepage. Last updated Nov. 29, 2010. 43 pages. http://www.meekeraviation.com/home-1/.
MōVI 'Ninja Star' Adapter Plate. Publicly accessible no later than Mar. 7, 2014. 1 page. https://web.archive.org/web/20140307091809/http://store.freeflysystems.com/collections/movi-accessory/products/ninja-star.
New Draganflyer Shadow and Draganflyer Guardian Helicopters Serve to Protect and Inspect. Published Jan. 14, 2014. 4 pp.. Available at http://www.prweb.com/releases/Draganflyer-Shadow/Draganflyer-Guardian/prweb11481237.htm ("Draganflyer Release").
Office action dated Jul. 21, 2016 for U.S. Appl. No. 15/154,740.
Quick release mount for Tarot gimbal. Published Dec. 21, 2013. 2 pages available at https://www.youtube.com/watch?v=4obZq1Rf0L0 ("Tarot Video C").
RCGROUPS forum posting—Quick Release gimbal adapter? Publicly accessible no later than Apr. 3, 2014. 4 pages. http://www.rcgroups.com/forums/showthread.php?t=2138827.
StabilizerNews. NAB 2014—Quick overview of some new MoVI products at Freefly Booth. Published Apr. 10, 2014. 3 pages. https://www.youtube.com/watch?v=Y8GEq7steMQ&feature=youtu.be.
Steadycam Test: Brushless Gimbal, 7 D, Inline Skate. Published Feb. 4, 2014. 2 pages. Available at https://www.youtube.com/watch?v=vYbhtO8f4ZM ("Handheld Video 2").
Tarot 2 Axis Brushless Camera Gimbal With Gyro TL68A00 For GoPro 3. Published Jan. 12, 2014 2 pages. Available at https://www.youtube.com/watch?v=J9P8jMF3Cus ("Tarot Video F").
Tarot Gopro two-axis brushless gimbal / have gyro TL68A00. Publicly accessible Aug. 21, 2013. 4 pages. Available at https://web.archive.org/web/20130821070917/http://www.tarot-rc.com/index.php?main_page=product_info&products_id=1029 (Tarot Gimbal-).
Tarot T-2D Brushless Gimbal on Helmat Published Sep. 27, 2013. 3 pages. Available at https://www.youtube.com/watch?v=gY2811NVoNM("Tarot Video G").
Tarot T-2d Gopro handheld gimbal. Published Jan. 12, 2014. 3 pages. Available at https://www.youtube.com/watch?v=rYvlYr8wG58 ("Tarot Video A").
Toad in the Hole on Freefly Store. Postings made Apr. 20, 2014-Apr. 24, 2014. 8 pages. Available at http://forum.freeflysystems.com/index.php?threads/toad-in-the-hole-on-freefly-store.3961/ ("Toad in the Hole Quick Release Forum 2").
Toad in the Hole quick release mounting system. Postings made Apr. 13, 2014-Apr. 22, 2014. 7 pages. Available at http://forum.freeflysystems.com/index.php?threads/toad-in-the-hole-quick-release-mounting-system.3892/ ("Toad in the Hole Quick Release Forum 1").
X4-C Options v3. Accessed Oct. 17, 2016. 1 page. Available at https://www.draganfly.com/uav-helicopter/draganflyer-x4c/specifications/x4c_system_options_v3.pdf (X4 Options).
Submission in Case No. 5:16-cv-00595-BRO(KKx). Dated Oct. 13, 2016. With Appendix A and Exhibits 22 through 27. 226 pages.
Yuneec USA, Inc's Amended Answer to Plaintiffs Complaint, Affirmative Defenses, and Amended Counterclaims Case No. 5:16-cv-00595-BRO-KK. Filed Jun. 27, 2016. 30 pages.
Office action dated Jan. 5, 2017 for U.S. Appl. No. 15/092,959.
Office action dated Nov. 22, 2016 for U.S. Appl. No. 15/154,740.
AbelCine Blog Posting. Archived Apr. 10, 2014. 1 page. Available at https://web.archive.org/web/20140410181748/http://blog.abelcine.com/2014/04/08/nab-2014-freefly-systems-movi-m15-accessories/.
Affidavit of Christopher Butler. Dated Aug. 22, 2016. 2 pages.
Declaration of Gunnar Ristroph. Dated Oct. 22, 2016. 67 pages.
Declaration of Marc Ausman regarding the GB200 System. Dated Sep. 19, 2016. 3 pages.
Declaration of Tian Yu regarding the GB200 System. Dated Sep. 22, 2016. 26 pages.
DJI's Disclosure of Asserted Claims and Infringement Contentions. Dated Aug. 29, 2016. 98 pages.
Exhibit 1004—Applicant-Initiated Interview Summary dated Nov. 19, 2015 in U.S. Appl. No. 14/463,558.
Exhibit 1005—Response dated Dec. 9, 2015 to office action dated Sep. 10, 2015 in U.S. Appl. No. 14/463,558.
HTML Code for Archive of AbelCine Blog Post from Archive.org. Accessed Aug. 29, 2016. 30 pages.
NAB 2014 "F" Exhibitors list. Archived on Mar. 8, 2014. 1 page. Available at https://web.archive.org/web/20140308020310/http://nab14.mapyourshow.com/5_0/exhibitor_results.cfm?type=alpha&alpha=F.
NAB 2014 "Y" Exhibitors list. Archived on Mar. 20, 2014. 1 page. Available at https://web.archive.org/web/20140320090232/http://nab14.mapyourshow.com/5_0/exhibitor_results.cfm?type=alpha&alpha=Y.
Post Grant Review of now U.S. Pat. No. 9,280,038. dated Oct. 22, 2016. 106 pages.
Transcript of NAB 2014—Quick overview of some new MoVI products at Freefly Booth. Published Apr. 10, 2014. 2 pages.
Transcript of NAB 2014: Freefly Systems MōVI M15 & Accessories. Published Apr. 8, 2014. 4 pages.
Notice of allowance dated Apr. 17, 2017 for U.S. Appl. No. 15/092,959.
Office action dated Mar. 17, 2017 for U.S. Appl. No. 15/154,740.
Notice of allowance dated Jun. 7, 2017 for U.S. Appl. No. 15/092,959.
Notice of allowance dated Jun. 30, 2017 for U.S. Appl. No. 15/092,959.
Office action dated Jul. 20, 2017 for U.S. Appl. No. 15/154,740.

* cited by examiner

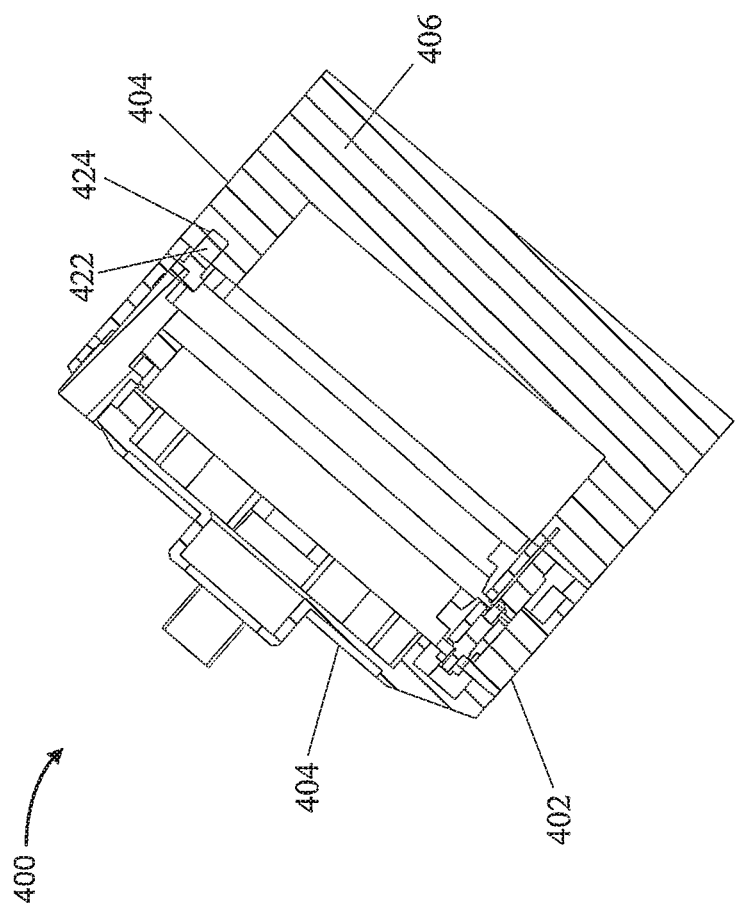

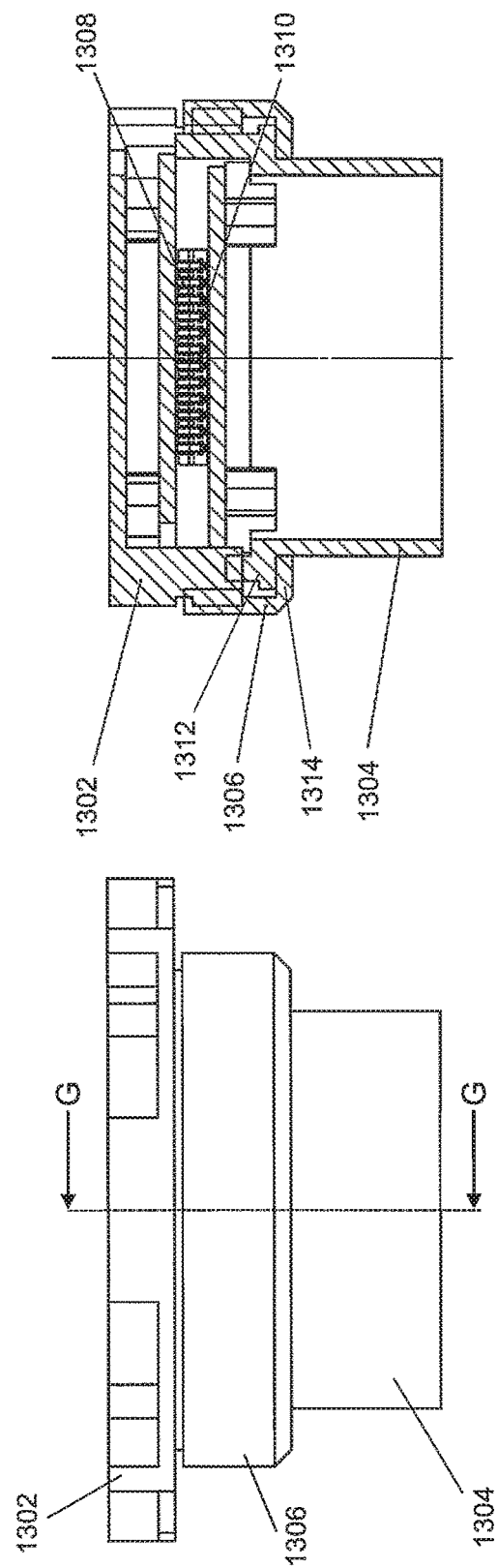

INTERCHANGEABLE MOUNTING PLATFORM

CROSS-REFERENCE

This application is a continuation of U.S. patent application Ser. No. 14/463,558, filed Aug. 19, 2014, now U.S. Pat. No. 9,280,038, issued Mar. 8, 2016, which is a continuation of International Application No. PCT/CN2014/076420, filed Apr. 28, 2014, the contents of each of which are hereby incorporated by reference in their entirety.

BACKGROUND OF THE INVENTION

Aerial vehicles such as unmanned aerial vehicles can be used for performing surveillance, reconnaissance, and exploration tasks for military and civilian applications. Such vehicles may carry a payload configured to perform a specific function. Typically, the payload is coupled to the vehicle via a suitable mounting platform. For example, an unmanned aerial vehicle used for aerial photography may be equipped with a gimbal for carrying a camera.

Existing mounting platforms may permit a payload to be carried only by a single vehicle type. This may prevent the user from using the payload with other vehicle types, thereby limiting the usability and versatility of the payload.

SUMMARY OF THE INVENTION

In some instances, it may be desirable for a payload to be interchangeably mounted to many different types of vehicles, as well as other objects, using a single mounting platform. Thus, a need exists for improved mounting platforms for coupling a payload to diverse types of base supports. The present invention provides systems, methods, and devices related to mounting platforms that can be interchangeably coupled to base supports, such as a movable object or an adapter carried by a movable object. Such mounting platforms may enable data transmission between a payload coupled to the platform and the base support. Furthermore, the mounting platform may be configured to control a spatial disposition of the payload. Advantageously, the mounting platforms described herein, along with related systems, methods, and devices, permit the payload to be used in many different contexts, thereby improving convenience and flexibility for the user.

Thus, in one aspect, a platform for interchangeably mounting a payload to a base support is provided. The platform comprises: a support assembly configured to be releasably coupled to a payload via a first coupling and configured to control a spatial disposition of the payload; and a mounting assembly configured to be releasably coupled via a second coupling to a plurality of types of base supports selected from at least two of the following: an aerial vehicle, a handheld support, or a base adapter mounted onto a movable object.

In some embodiments, the payload can include an imaging device.

In some embodiments, the support assembly can be electrically coupled to the payload. The mounting assembly can be electrically coupled to the base support. The first and second couplings can enable transmission of data between the payload and the base support. The data can include payload data provided by the payload to the base support. Alternatively, the data can include control signals provided by the base support to at least one of the support assembly or the payload. The control signals can control the spatial disposition of the payload via the support assembly. Optionally, the control signals can control a function of the payload. The first and second couplings can enable transmission of power from the base support to the payload.

In some embodiments, the support assembly can be configured to control an orientation of the payload relative to the base support. The orientation of the payload can be controlled with respect to at least two axes of rotation relative to the base support In some embodiments, the base support includes a transmitter configured to transmit payload data provided by the payload to a remote device. The transmitter can include a wireless transmitter. The base support can be configured to reduce vibrations of the payload. The aerial vehicle can be an unmanned aerial vehicle. The movable object can be a vehicle. The base adapter can be a wearable base adapter and the movable object can be a human being.

In another aspect, an aerial vehicle can include a vehicle body and an interface situated on the vehicle body and configured to be releasably coupled to the mounting assembly of a platform provided herein.

In another aspect, a method for interchangeably mounting a payload is provided. The method comprises: providing a mounting platform releasably coupled to a payload via a first coupling and configured to control a spatial disposition of the payload, the mounting platform releasably coupled to a first base support via a second coupling; decoupling the mounting platform from the first base support; and releasably coupling the mounting platform, via a third coupling, to a second base support different from the first base support; wherein the first and second base supports are each selected from one of the following: an aerial vehicle, a handheld support, or a base adapter mounted onto a movable object.

In some embodiments, the payload can include an imaging device.

In some embodiments, the support assembly can be electrically coupled to the payload. The mounting platform can be electrically coupled to at least one of the first or second base supports. The first and second couplings can enable transmission of data between the payload and the first base support. The data can include payload data provided by the payload to the first base support. Alternatively, the data can include control signals provided by the first base support to at least one of the mounting platform or the payload. The control signals can control the spatial disposition of the payload via the mounting platform. Optionally, the control signals can control a function of the payload. The first and second couplings can enable transmission of power from the first base support to the payload.

In some embodiments, the mounting platform can be configured to control an orientation of the payload relative to the base support. The orientation of the payload can be controlled with respect to at least two axes of rotation relative to the base support In some embodiments, the base support includes a transmitter configured to transmit payload data provided by the payload to a remote device. The transmitter can include a wireless transmitter. The base support can be configured to reduce vibrations of the payload. The aerial vehicle can be an unmanned aerial vehicle. The movable object can be a vehicle. The base adapter can be a wearable base adapter and the movable object can be a human being.

In another aspect, a handheld platform for controlling an imaging device is provided. The handheld platform comprises: a handheld support member configured to be releasably mechanically and electrically coupled via an electromechanical coupling to a gimbal assembly controlling a spatial disposition of a coupled imaging device, the electromechanical coupling enabling transmission of image data from the imaging device to the handheld support member; and an input interface carried by the handheld support member and configured to receive input from a user, the input comprising commands provided to the gimbal assembly via the electromechanical coupling for controlling the spatial disposition of the imaging device.

In some embodiments, the imaging device includes a mobile device or camera.

In some embodiments, the commands are configured to control rotation of the imaging device relative to the handheld support member about at least one of a roll axis, a pitch axis, or a yaw axis. The input can further include commands provided to the imaging device via the electromechanical coupling for controlling a function of the imaging device. The function can include at least one of a record function, a zoom function, a power on function, or a power off function.

In some embodiments, the handheld support member can include a power supply and the electromechanical coupling can enable transmission of power from the power supply to the imaging device. The handheld support member can include a transmitter configured to transmit the image data to a remote device. The transmitted can include a wireless transmitter. The handheld support member can include a display unit for displaying the image data.

In some embodiments, the gimbal assembly can be configured to be releasably mechanically and electrically coupled to an aerial vehicle.

In another aspect, a handheld system for generating image data comprises a handheld platform provided herein, a gimbal assembly releasably mechanically and electrically coupled to the handheld platform, and an imaging device coupled to the gimbal assembly.

In another aspect, a platform for interchangeably mounting an imaging device to a base support is provided. The platform comprises: a support assembly configured to be releasably coupled to the imaging device via a first coupling and configured to control a field of view of the imaging device; and a mounting assembly configured to be releasably coupled via a second coupling to a plurality of types of base supports selected from at least two of the following: an aerial vehicle, a handheld support, or a base adapter mounted onto a movable object.

In some embodiments, the imaging device includes a mobile device or camera.

In some embodiments, the support assembly can be electrically coupled to the imaging device. The mounting assembly can be electrically coupled to the base support. The first and second couplings can enable transmission of image data provided by the imaging device between the imaging device and the base support. Alternatively, the first and second couplings can enable transmission of control signals provided by the base support to at least one of the support assembly or the imaging device. The control signals can control a field of view of the imaging device. Optionally, the control signals can control at least one of a record function, a zoom function, a power on function, or a power off function of the imaging device. The first and second couplings can enable transmission of power from the base support to the imaging device.

In some embodiments, the base support includes a transmitter configured to transmit image data provided by the imaging device to a remote device. The transmitter can include a wireless transmitter. The base support can be configured to reduce vibrations of the imaging device. The aerial vehicle can be an unmanned aerial vehicle. The movable object can be a vehicle. The base adapter can be a wearable base adapter and the movable object can be a human being.

In another aspect, an aerial vehicle can include a vehicle body and an interface situated on the vehicle body and configured to be releasably coupled to the mounting assembly of a platform provided herein.

In another aspect, a method for interchangeably mounting an imaging device is provided. The method comprises: providing a mounting platform releasably coupled to the imaging device via a first coupling and configured to control a field of view of the imaging device, the mounting platform releasably coupled to a first base support via a second coupling; decoupling the mounting platform from the first base support; and releasably coupling the mounting platform, via a third coupling, to a second base support different from the first base support; wherein the first and second base supports are each selected from one of the following: an aerial vehicle, a handheld support, or a base adapter mounted onto a movable object.

In some embodiments, the imaging device includes a mobile device or camera.

In some embodiments, the mounting platform can be electrically coupled to the imaging device. The mounting platform can be electrically coupled to at least one of the first or second base supports. The first and second couplings can enable transmission of image data provided by the imaging device between the imaging device and the first base support. Alternatively, the first and second couplings can enable transmission of control signals provided by the first base support to at least one of the mounting platform or the imaging device. The control signals can control a field of view of the imaging device. Optionally, the control signals can control at least one of a record function, a zoom function, a power on function, or a power off function of the imaging device. The first and second couplings can enable transmission of power from the first base support to the imaging device.

In some embodiments, at least one of the first or second base supports includes a transmitter configured to transmit image data provided by the imaging device to a remote device. The transmitter can include a wireless transmitter. At least one of the first or second base supports can be configured to reduce vibrations of the imaging device. The aerial vehicle can be an unmanned aerial vehicle. The movable object can be a vehicle. The base adapter can be a wearable base adapter and the movable object can be a human being.

It shall be understood that different aspects of the invention can be appreciated individually, collectively, or in combination with each other. Various aspects of the invention described herein may be applied to any of the particular applications set forth below or for any other types of base supports. Some of the base supports described herein may be movable objects. Any description herein of movable objects, such as an aerial vehicle, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4B is a cross-section of the coupling mechanism of FIG. 4A through line D-D;

FIG. 13B illustrates a side view of the coupling mechanism of FIG. 13A, in accordance with embodiments;

FIG. 13C illustrates a cross-sectional view of the coupling mechanism of FIG. 13B through line G-G, in accordance with embodiments;

DETAILED DESCRIPTION OF THE INVENTION

Figure 1:
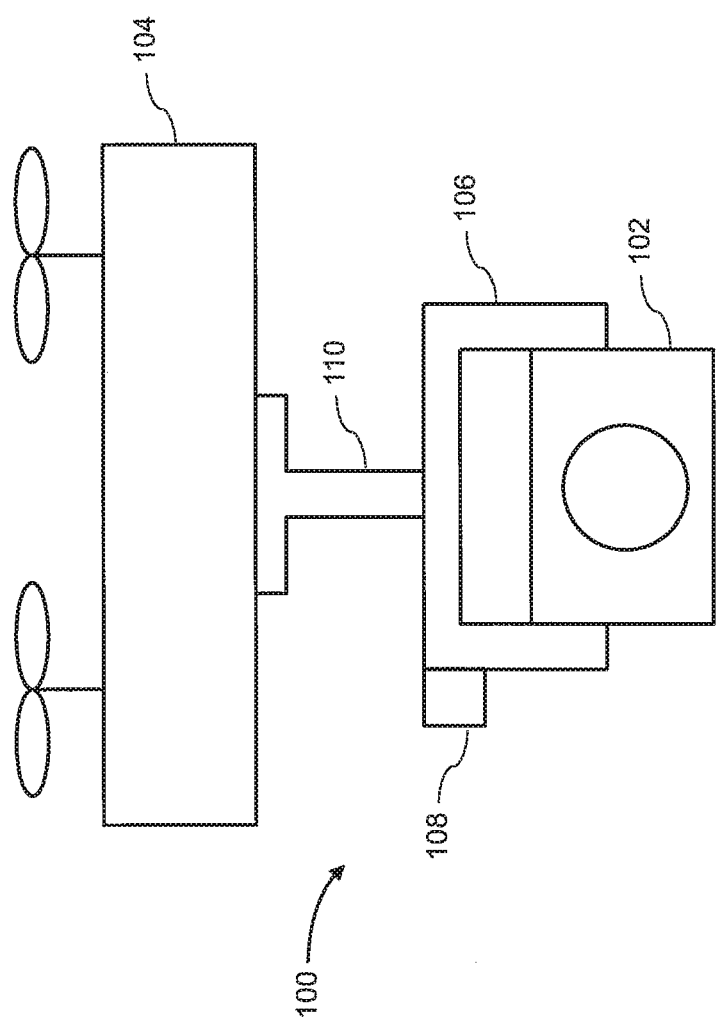
FIG. 1 illustrates a mounting platform for coupling a payload to a base support, in accordance with embodiments.

The systems, devices, and methods of the present invention provide improved mounting platforms that enable a payload to be interchangeably coupled to a plurality of different types of base supports. The base support can be a movable object (e.g., an unmanned aerial vehicle (UAV)), a base adapter mounted onto a movable object, or any other device for supporting the payload, such as a handheld support. In some embodiments, the mounting platforms described herein include electrical couplings permitting data transmission between the base support (and/or a movable object coupled thereto) and the payload. Advantageously, the mounting platform can be quickly coupled to and/or decoupled from the base supports, thereby enabling the payload to be used interchangeably with a wide variety of base supports.

For example, an interchangeable mounting platform can be used to mount an imaging device (e.g., a camera) to a UAV. The mounting platform may be operable to control a spatial disposition of the imaging device relative to the UAV, such that the orientation of the imaging device can be adjusted with respect to up to three axes of freedom. Additionally, when desired, the mounting platform can be detached from the UAV and coupled to a handheld support (e.g., a handle). The handheld support, can be configured to accept user input for controlling the spatial disposition of the imaging device and/or a function of the imaging device (e.g., an image capture function). Accordingly, the mounting platform enables the camera to be used for aerial imaging as well as for handheld photography.

Thus, in one aspect, the present invention provides a platform for interchangeably mounting a payload to a base support. In some embodiments, the platform includes a support assembly configured to be releasably coupled to a payload, and a mounting assembly configured to be releasably coupled to a base support. The support assembly can be configured to control a spatial disposition of the payload (e.g., position, orientation). The mounting assembly can be configured to couple a plurality of types of base supports, such as at least two different types of base supports.

Examples of base supports include an aerial vehicle, a handheld support, or a base adapter mounted onto a movable object (e.g., a vehicle) or wearable by a movable object (e.g., a human being). In contrast to existing approaches in which different base supports require different mounting platforms, the disclosed platform can be used interchangeably with many different types of base supports, thus improving flexibility and convenience for the user.

Furthermore, the support assembly can be electrically coupled to the payload, and the mounting assembly can be electrically coupled to the base support. The electrical couplings of the support assembly and the mounting assembly can enable transmission of data between the payload and the base support. For example such data may include payload data provided by the payload to the base support, as well as control signals provided by the base support to the payload (or the support assembly) to control the spatial disposition of the payload. In some embodiments, the payload may be an imaging device, and the support assembly can be configured to control a field of view of the imaging device. Accordingly, the control signals provided by the base support can be used to control the field of view of the imaging device. Furthermore, the electrical couplings may enable the support assembly and/or payload to be powered by the base support. The functionalities described herein In another aspect, the present invention provides a method for interchangeably mounting a payload. The method includes providing a mounting platform releasably coupled to a payload and configured to control a spatial disposition of the payload. In some embodiments, the mounting platform can be releasably coupled to an imaging device and configured to control a field of view of the imaging device. The mounting platform can be releasably coupled to a first base support. The method includes decoupling the mounting platform from the first base support, followed by coupling the mounting platform to a second base support different from the first base support via a releasable coupling. The base supports described above are equally applicable to these embodiments. The couplings may be electrical couplings enabling transmission of data between the payload (e.g., image data from an imaging device) and at least one of the first or second base supports, as previously mentioned.

In another aspect, the present invention provides a handheld platform for controlling an imaging device. In some embodiments, the platform includes a handheld support member configured to be releasably mechanically and electrically coupled to a gimbal assembly, and an input interface carried by the handheld support. The gimbal assembly can be coupled to an imaging device, and can be used to control the spatial disposition of the imaging device. The input interface can receive input from a user, such as commands provided to the gimbal assembly via the electrical coupling for controlling the spatial disposition of the imaging device. Where desired, the electrical coupling can enable transmission of image data generated by the imaging device to the handheld support.

A payload of the present invention can include non-living entities (e.g., cargo, equipment, instruments) as well as living entities (e.g., passengers). The payload may be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an imaging device (e.g., a camera, a mobile device including a camera such as a smartphone), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for an object targeted by the payload (e.g., an object targeted for surveillance). Alternatively or in combination, the payload can include one or more emitters for providing signals to one or more targets. Any suitable emitter can be used, such as an illumination source or a sound source. In some embodiments, the payload includes one or more transceivers, such as for communication with a remote entity. Optionally, the payload can be configured to interact with the environment or a target. For example, the payload can include a tool, instrument, or mechanism capable of manipulating objects, such as a robotic arm.

The payload may be stabilized so as to reduce vibrations or other unwanted motions that may interfere with the payload operation. In some instances, the entire payload may be stabilized. Alternatively, some portions of the payload may be stabilized, while other portions may not be stabilized. For example, the payload can be a camera or other imaging device in which the optical components (e.g., lenses, image sensors) are stabilized, while the non-optical components (e.g., positional sensor, storage medium, battery, motors, circuitry, power supply, processor, housing, etc.) are not stabilized.

In some embodiments, the payload can be carried by a suitable base support. The base support can be configured to support some or all of the weight of the payload. As previously mentioned, the base support can be a movable object, examples of which are described in further detail elsewhere herein. Alternatively, the base support can be an adapter (e.g., a rack, frame, holder, mount, cradle, bracket, plate, handle, etc.) configured to be coupled to and/or carried by a movable object. In some instances, the base support can be an adapter that is worn by a living entity (e.g., a human) or coupled to an object worn by a living entity (e.g., a helmet, harness). Exemplary embodiments of suitable base supports are provided below.

The payload can be coupled to the base support using a mounting platform, which may also be referred to herein as a "carrier" or a "gimbal assembly." The payload may be integrally formed with the mounting platform. Alternatively, the payload provided separately from and coupled to the mounting platform. The coupling may be a permanent coupling or a releasable coupling. For example, the payload may be coupled to the mounting platform using adhesives, bonding, welding, fasteners (e.g., screws, nuts, bolts, pins), interference fits, snap fits, and the like. The coupling may fix the payload at specified position and/or orientation relative to the mounting platform. Alternatively, the coupling may permit movement of the payload with respect to the mounting platform (e.g., with up to six axes of freedom of motion).

The mounting platform can be coupled to the base support, either directly or indirectly, and the coupling may be a permanent coupling or a releasable coupling. Exemplary coupling mechanisms are described in further detail elsewhere herein. Any description herein pertaining to couplings between a payload and a mounting platform can also be applied to couplings between a base support and the mounting platform, and vice-versa. The coupling between the base support and the mounting platform may permit motion of the mounting platform relative to the base support (e.g., up to three axes of freedom in translation and/or up to three axes of freedom in rotation). Alternatively, the spatial disposition of the mounting platform may be fixed relative to the base support.

In some embodiments, the mounting platform can be configured to control a state of the payload, such as the spatial disposition of the payload (e.g., position and/or orientation). For example, the mounting platform may include one or more gimbals directing the movement of the payload relative to the base support. In some embodiments, the mounting platform can permit the payload to move relative to the base support (e.g., with respect to one, two, or three axes of translation and/or one, two, or three axes of rotation). Conversely, the mounting platform can constrain the movement of the payload relative to the base support along one or more directions. As another example, the mounting platform can be configured to move relative to the base support (e.g., with respect to one, two, or three axes of translation and/or one, two, or three axes of rotation) such that the payload maintains its position and/or orientation relative to a suitable reference frame regardless of the movement of the base support. The reference frame can be a fixed reference frame (e.g., the surrounding environment). Alternatively, the reference frame can be a moving reference frame (e.g., the base support, a payload target). In some embodiments, the mounting platform can be adapted to reduce or prevent certain movements of the payload. For example, the mounting platform may include one or more stabilizing elements (e.g., dampers) for reducing or eliminating unwanted motions of the payload (e.g., shaking and/or vibrations).

Alternatively, the mounting platform can control a state of the payload by controlling a function of the payload. For example, the mounting platform can control an on/off state of the payload. As another example, the mounting platform can control the payload so as to cause the payload to operate according to a specified operating mode. Furthermore, the mounting platform can control the payload so as to cause the payload to perform a function, stop performing a function, perform a function at specified intervals, and so on. In some embodiments, when the payload is an imaging device, the mounting platform can be configured to control a field of view of the imaging device. The mounting platform may control the field of view by controlling the spatial disposition of the imaging device, as described above. Alternatively or in addition, the field of view can be changed by controlling suitable functions of the imaging device, such as by controlling the zoom level, viewing angle, focus, etc. of the imaging device.

Referring now to the drawings, FIG. 1 depicts a mounting platform 100 for coupling a payload 102 to a base support 104, in accordance with embodiments. Although the payload 102 is depicted in FIG. 1 as a camera, the payload 102 can be any suitable device or apparatus, and any description herein related to an imaging device such as a camera can be applied to other types of payloads, and vice-versa. Additionally, although the base support 104 is illustrated as an aerial vehicle, other types of base supports can also be used, and any described herein relating to an aerial vehicle can also be applied to other base supports.

The mounting platform 100 can include a support assembly 106, one or more actuators 108, and a mounting assembly 110. The support assembly 106 can couple and provide structural support to the payload 102. For example, the support assembly 106 can include a cradle, bracket, frame, holder, arm, or any other element suitable for coupling the payload 102. As previously mentioned, the payload 102 can be releasably coupled to the support assembly 106. In some embodiments, the support assembly 102 can be configured to control a spatial disposition of the payload 102. For example, when desired, the support assembly 106 can control the orientation of the payload 102 with respect to at least two axes of freedom relative to the base support 104. The movement of the support assembly 106 can produce a corresponding movement of the payload 102. In some embodiments, when the payload 102 is an imaging device, movement(s) of the support assembly 106 can be used to alter the field of view of the imaging device (e.g., by controlling the spatial disposition).

The movement of the support assembly 106 may be actuated by the one or more actuators 108 (e.g., motors, such as AC motors or DC motors). Any number of actuators can be used, such as one, two three, four, five, or more. The actuators 108 can actuate a rotation of the support assembly 106 about one or more axes of rotation (e.g., roll axis, pitch axis, or yaw axis). The rotation can cause the payload 102 to rotate about one or more corresponding axes of rotation relative to the base support 104. Alternatively or in combination, the one or more actuators 108 can actuate a translation of the support assembly 106 along one or more axes of translation, and thereby produce a translation of the payload 102 along one or more corresponding axes relative to the base support 104.

In some embodiments, the support assembly 106 can include a plurality of individual support assembly components (e.g., cradles, brackets, frames, holders, arms), some of which may be movable relative to one another. For example, a first component may rotate the payload 102 about a roll axis, a second component may rotate the payload 102 about a pitch axis, and a third component may rotate the payload 102 about a yaw axis. As another example, a first component may translate the payload 102 along a first translation axis, a second component may translate the payload 102 along a second translation axis, and a third component may translate the payload 102 along a third translation axis. Any suitable combination of support assembly components can be used in order to achieve the desired combination of translational and/or rotational movements. The support assembly components may each be capable of moving independently. Alternatively, the movement of the at least some of the components may be dependent on or otherwise linked to the movement of other components. The actuators 108 can actuate the movement of the support assembly components. In some instances, each support assembly component can be coupled to a single actuator. Alternatively, a single actuator can be coupled to a plurality of support assembly components, or vice-versa. The actuators 108 can permit the movement of multiple support assembly components simultaneously, or may be configured to permit the movement of a single support assembly component at a time. Any description herein relating to the support assembly can also be applied the individual components of the support assembly, and vice-versa.

In some embodiments, the support assembly 106 can include one or more motion sensors (not shown) configured to detect the movement of the support assembly 106 (or individual components thereof) and/or the payload 102. For example, the motion sensors may include gyroscopes, accelerometers, or suitable combinations thereof. Where desired, the motion sensors can be provided as part of an inertial measurement unit (IMU). The motion data provided by the motion sensors can be used to determine the current spatial disposition of the support assembly 106 and/or the payload 102. For example, the motion data may be fed back to the actuators 108 (or a suitable device controlling the actuators 108) in order to generate more precise movements of the support assembly 106.

The mounting assembly 110, which may be optional, can be used to couple the support assembly 106 to the base support 104. The mounting assembly 110 can be any device or mechanism suitable for interfacing between the support assembly 106 and the base support 104, such as a plate, bracket, frame, stand, arm, shaft, or suitable combinations of such devices. In some embodiments, the mounting assembly 110 can be integrally formed with the support assembly 106. Alternatively, the mounting assembly 110 can be formed separately from the support assembly 106 and coupled to the support assembly 106 using any of the techniques described herein. The coupling between the mounting assembly 110 and the support assembly 106 may permit the support assembly 106 to be moved relative to the mounting assembly 110 (e.g., with up to three axes of freedom in translation and/or up to three axes of freedom in rotation). The mounting assembly 110 can be coupled to the base support 104, using any of the coupling approaches described elsewhere herein. The spatial disposition of the mounting assembly 110 may be fixed relative to the base support 104. Alternatively, the mounting assembly 110 may be movable relative to the base support 104 (e.g., with up to three axes of freedom in translation and/or up to three axes of freedom in rotation).

In addition to mechanically coupling the payload 102 and the base support 104, the mounting platform 100 can also be configured to operably couple the payload 102 and the base support 104. For example, the mounting platform 100 can be electrically coupled to the payload 102 and the base support 104 in a manner permitting electrical communication between the payload 102 and the base support 104. In some embodiments, the support assembly 106 can be electrically coupled to the payload 102, the mounting assembly 110 can be electrically coupled to the base support 104, and the support assembly 106 can be electrically coupled to the mounting assembly 110, such that an electrically conductive path is provided between the payload 102 and base support 104 via the mounting assembly 110 and support assembly 106. The electrical couplings can utilize wires, cables, pins, prongs, plugs, sockets, rings, or other any other suitable electrical connecting elements. In some instances, the electrical couplings may be configured to maintain electrical connectivity (e.g., via slip rings and the like) even if one or more coupled elements (e.g., the payload 102, base support 104, the mounting platform 100, or components thereof) are moving relative to each other. Similar to the mechanical couplings described herein, the electrical couplings may be releasable couplings enabling a user to rapidly couple and/or decouple the mounting platform 100 from the base support 104 (or the payload 102). In some embodiments, the mechanical and electrical couplings can be integrated into a releasble electromechanical interface coupling the mounting platform 100 to the base support 104 and/or the payload 102.

Figure 2:
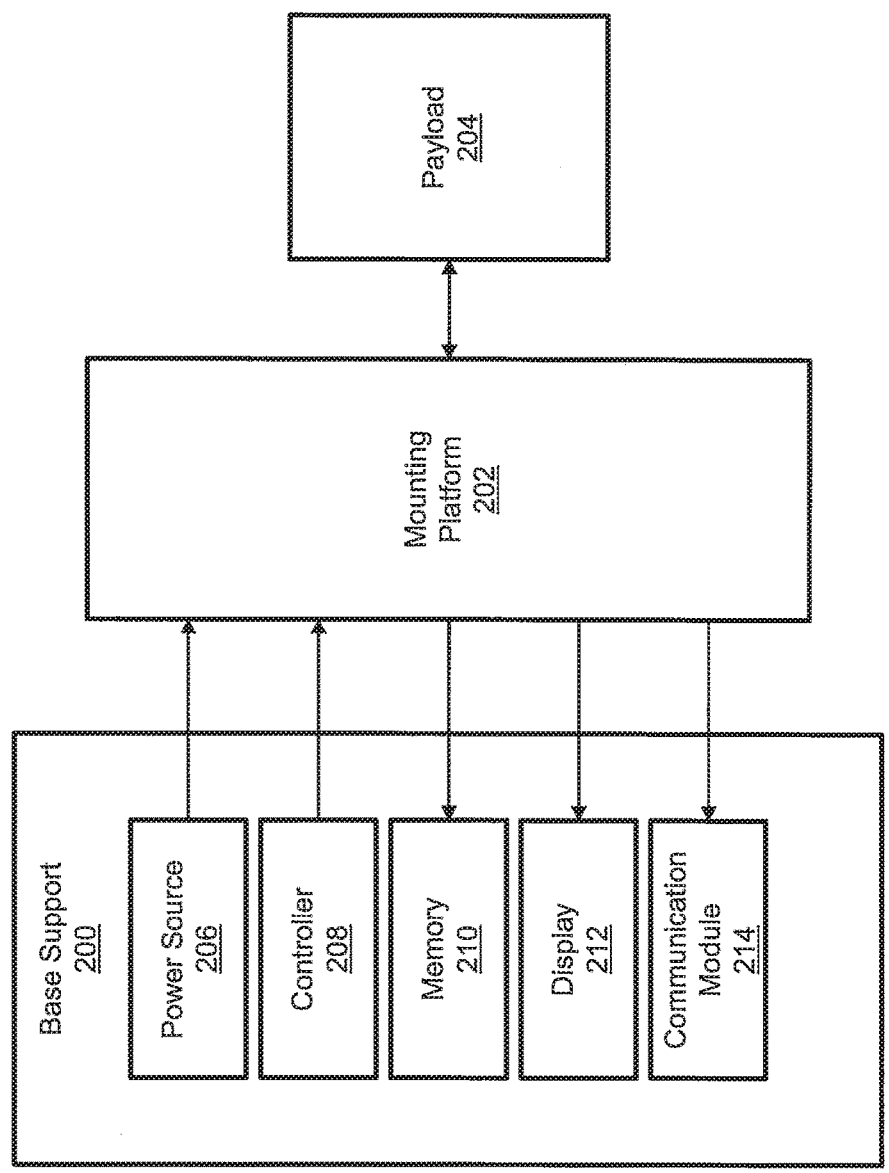
FIG. 2 illustrates couplings between a base support, mounting platform, and payload, in accordance with embodiments.

FIG. 2 illustrates couplings between a base support 200, mounting platform 202, and payload 204, in accordance with embodiments. The base support 200 can be operably coupled to the payload 204 via respective connections to the mounting platform 202. In some embodiments, the base support 200 includes a plurality of functional components that are operably coupled to the payload 204 through the mounting platform 202, such as a power source 206, controller 208, memory 210, display 212, and communication module 214. Optionally, in alternative embodiments, the base support 200 and/or the functional components described herein can be operably coupled to the payload 204 independently of the mounting platform 202 (e.g., via wireless communication).

The power source 206 (e.g., one or more batteries) can be used to transmit power to the mounting platform 202, via the electrical couplings described herein. For example, the power source 206 can be used to power an actuator and/or a sensor of the mounting platform 202. The power source 206 may be a single-use power source, or a rechargeable power source. In some instances, the power source 206 can be charged while being carried by the base support 200. Alternatively, the power source 206 may need to be removed from the base support 200 in order to be charged. The power source 206 can be the same as the power source providing power to the base support 200, such that the power source 206 also provides power to other components of the base support 200 (e.g., a propulsion system, a flight control system, etc.) Conversely, the power source 206 may be separate from the power source powering the base support 200. In some embodiments, the power source 206 may also be the power source for the payload 204. Alternatively, the payload 204 may be equipped with its own power source, such that the power source 206 serves as a backup unit for the payload 204.

The controller 208 can be configured to generate control signals transmitted to the mounting platform 202. In some embodiments, the control signals can be used to control a spatial disposition of the payload 204 via the mounting platform 202, such as via the driving of one or more actuators of the mounting platform 202 as described herein. Alternatively or in addition, the control signals can be transmitted to the payload 204 via the mounting platform 202 in order to control a function of payload 204. For example, when the payload 204 is an imaging device, the controller 208 can generate signals for controlling at least one of a record function, zoom function, power on function, power off function, changing image resolution function, changing focus function, changing depth of field function, changing exposure time function, or changing viewing angle function of the imaging device. Control of one or more of these functions may result in a change in the field of view of the imaging device.

The control signals can be generated based on user input provided to the base support 200. For example, the controller 208 can be operably coupled to a suitable input interface for receiving control signals input by a user. The input interface can be located on the base support 200, thus enabling user commands to be entered directly to the base support 200. Alternatively, the input interface may be located on a device separate from the base support 200 (e.g., on a remote terminal, described elsewhere herein, or a computer, laptop, mobile device, tablet, etc.), such that the entered commands are transmitted to the base support 200 (e.g., via suitable wired or wireless communication methods, such as local area networks (LAN), wide area networks (WAN), infrared, radio, WiFi, point-to-point (P2P) networks, telecommunication networks, cloud communication, etc.) over an intervening distance. Examples of suitable input interfaces include keyboards, mice, buttons, joysticks, or touchscreens. In some embodiments, the control signals can be automatically generated by the base support 200 (or a separate device in communication with the base support 200) without any user input. For example, the control signals can be provided by a suitable onboard processor (not shown) of the base support 200.

Alternatively, the mounting platform 202 can be configured to receive control signals from devices other than the controller 208. For example, the mounting platform 202 can be in direct communication with a device separate from the base support 200 (e.g., a remote terminal, computer, laptop, mobile device, tablet, etc.), and thereby receive control signals for controlling operation of the mounting platform 202 and/or payload 204. As another example, the mounting platform 202 can include suitable hardware and/or software components enabling the mounting platform 202 to generate control signals independently.

In some embodiments, the payload 204 can transmit payload data to the base support 200 for storage within the memory 210. The payload data can be transmitted via the mounting platform 202, or directly to the base support 200 (e.g., via wireless communication). The payload data can be any data generated and/or obtained by the payload 204, such as sensor data (e.g., image data, position data, orientation data, motion data) as well as data relating to a current state of the payload 204 (e.g., data regarding whether the payload 204 is turned on, turned off, currently performing a certain function, completed a certain function, etc.) The payload 204 may transmit some or all of the payload data to the memory 210. In some embodiments, the payload data can be transmitted continuously. Alternatively, the payload data can be transmitted at certain times, such as at specified time intervals or when certain events occur (e.g., new data is generated).

The base support 200 can include a display 212, which can be any device suitable for visually displaying the data provided by the payload 204 to a user. For example, the display 212 can be a monitor or screen used to display photographs or videos generated by a camera. The display 212 may be integrally formed with the base support 200, or may be provided separately from and coupled to the base support 200. In some embodiments, the base support 200 can include an interface adapted to receive a mating interface of the display 212 (e.g., a socket or port) such that the display 212 can be releasably coupled to the base support 200. The data presented on the display 212 can be provided directly from the payload 204, or can be retrieved by the display 212 from the memory 210. The display 212 may receive and/or present payload data in real-time, or only at specified time intervals. In some embodiments, the display 212 can also be configured to display data other than payload data, such as data relating to a state of the mounting platform 202 (e.g., the current spatial disposition) and/or a state of the base support 200 (e.g., the base support type, spatial disposition, remaining power capacity, connectivity with other devices, etc.). The display 212 may be controlled by a user via the input interface described above.

The base support 200 can include a communication module 214 for communicating data between the base support 200 and a remote device. The module can include one or more receivers, transmitters, and/or transceivers. The receivers, transmitters, and/or transceivers can be configured to transmit data using any suitable wired or wireless communication method. For example, the communication module 214 can transmit data to the remote device via WiFi. Alternatively, the communication module 214 can transmit data to the remote device using cables such as USB cables, and may include suitable interfaces or ports for receiving such cables. The remote device can be a terminal, mobile device, computer, laptop, tablet, or movable object. For example, the communication module 214 can be used to communicate with a remote device providing user input control signals to the controller 208, as previously mentioned. In some embodiments, the communication module 214 can be used to transmit payload data to the remote device, and such payload data can be obtained directly from the payload 204 or retrieved from the memory 210. For example, the communication module 214 can be used to transmit image data to another device enabling a remote user to view the images collected by the payload 214. The communication module 214 can also transmit other types of data, such as data relating to a state of the mounting platform 202 and/or the base support 200. The operation of the communication module 214 can be controlled by a user, such as via a suitable input interface, as previously described.

Optionally, the base support 200 can be used to transmit data (e.g., image data such as video data, audio data, control data, etc.) to other base supports, using wired or wireless communication. The base supports described herein can be networked to each other in any suitable manner. For example, the base support 200 can be used as wireless hub for communicating between a plurality of other base supports. Some or all of the base supports can be controlled by a remote device or a plurality of remote devices. The base support 200 can receive control signals provided by the remote device(s) and relay the control signals to the other base supports. Conversely, the base support 200 can receive data (e.g., image data, audio data, etc.) provided by the other base supports and relay the data to the one or more remote devices.

Figure 3:
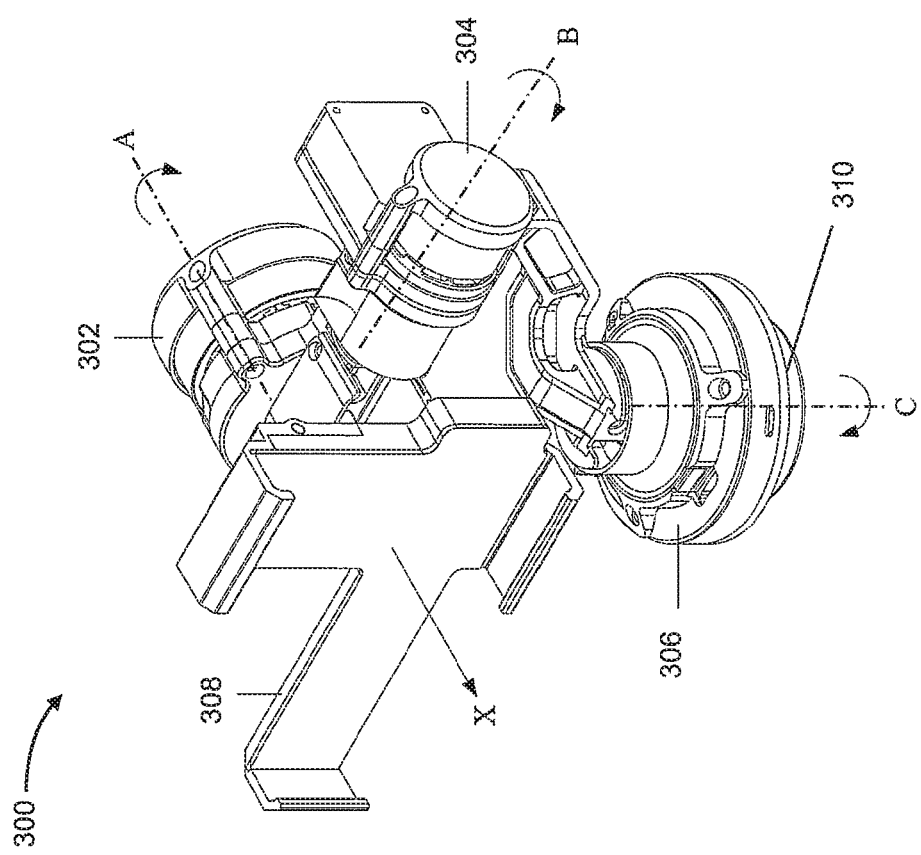
FIG. 3 illustrates a support assembly of a mounting platform, in accordance with embodiments.

FIG. 3 illustrates a support assembly 300 of a mounting platform, in accordance with embodiments. The support assembly 300 can be used to control the spatial disposition of a mounted payload, such as the orientation of the payload with respect to up to three axes of freedom. For example, the support assembly 300 may include a first orientation control unit 302, a second orientation control unit 304, a third orientation control unit 306, and a payload mount 308. The payload mount 308 can be configured to couple a payload. The first orientation control unit 302 can be fixedly coupled to the payload mount 308, the second orientation unit 304 can be fixedly coupled to the first orientation control unit 302, and the third orientation control unit 306 can be fixedly coupled to the second orientation control unit 304.

The first orientation control unit 302 can rotate the payload mount 308 and payload about a first axis A (e.g., a roll axis). The second orientation control unit 304 can rotate the first orientation control unit 302, the payload mount 308, and payload about a second axis B (e.g., a pitch axis). The third orientation control unit 306 can rotate the second orientation control unit 304, first orientation control unit 302, payload mount 308, and payload about a third axis C (e.g., a yaw axis). The axes A, B, C may be orthogonal axes. Alternatively, the axes A, B, and C may be non-orthogonal axes. Each of the orientation control units 302, 304, 306 can produce a rotation about its respective axis (e.g., clockwise and/or counterclockwise) using suitable actuators, such as motors.

The payload can be removably attached to the payload mount 308 (e.g., snap-fit, or using clamps, brackets, cradles, frames, etc.). In some embodiments, the payload can be secured to the payload mount 308 with a facing direction X. For example, the payload can be an imaging device (e.g., camera, smartphone, mobile device), such that the optical axis of the imaging device is the facing direction X. The facing direction X may be parallel to the first axis A. Alternatively, the facing direction X may be nonparallel to the first axis A.

The support assembly 300 can be mounted onto a base support, which may be a UAV or other movable object, a base adapter mounted onto a movable object, or a handheld support, as previously described herein. In some embodiments, the third orientation control unit 306 can be connected to a mounting assembly 310. The mounting assembly 310 can be coupled to or integrally formed with the third control unit 306. The mounting assembly 310 can include one or more coupling features configured to couple to the support assembly 300 to a base support. For example, the mounting assembly 310 can include screw threads (male or female) adapted to mate with complementary screw threads on the base support. Alternatively or in addition, the mounting assembly 310 can include features configured to interlock with complementary features on the base support. Other exemplary mounting assemblies are described in greater detail below. Where desired, the mounting assembly 310 can include components for reducing vibrations or shaking of the payload when mounted onto the base support, such as rubber dampers.

In some embodiments, the support assembly 300 can be configured to control the orientation of the payload with respect to the two axes of freedom. Accordingly, in these embodiments, the support assembly 300 may include only the first and second orientation control units 302, 304, and the mounting assembly 310 may be positioned on the second orientation control unit 304. Similarly, in some embodiments, the support assembly 300 can be configured to control the orientation of the payload with respect to one degree of freedom. In such instances, the support assembly 300 may include only the first orientation control unit 302, and the mounting assembly 310 may be positioned on the first orientation control unit 302.

Figure 4A:
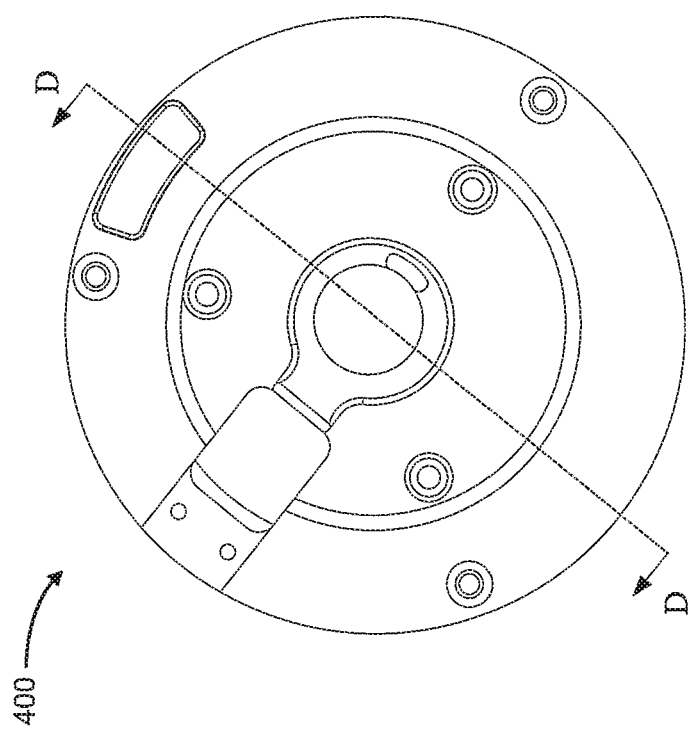
FIG. 4A illustrates a top view of a coupling mechanism for connecting a mounting platform to a base support; in accordance with embodiments.

FIGS. 4A-4H illustrate a coupling mechanism 400 for connecting a mounting platform to a base support (e.g., movable object such as a UAV, base adapter coupled to a movable object, or handheld support), in accordance with embodiments. FIG. 4A illustrates a top view of the coupling mechanism 400, while FIG. 4B illustrates a cross-section of the coupling mechanism 400 taken through line D-D. The coupling mechanism 400, as with all other coupling mechanisms described herein, may be a quick release coupling mechanism. A quick release coupling mechanism may enable a user to rapidly mechanically couple and/or decouple a plurality of components with a short sequence of simple motions (e.g., rotating or twisting motions; sliding motions; depressing a button, switch, or plunger; etc.). For example, a quick release coupling mechanism may require no more than one, two, three, or four motions to perform a coupling and/or decoupling action. In some instances, a quick release coupling mechanism can be coupled and/or decoupled manually by a user without the use of tools.

The coupling mechanism 400 includes a first portion 402 and a second portion 404 adapted to releasably couple to each other. The first portion 402 may be situated on the mounting platform (e.g., coupled to or integrally formed with a portion 406 of a mounting assembly) and the second portion 404 can be situated on the base support (e.g., coupled to or integrally formed with a portion 408 of the base support). Alternatively, the first portion 402 can be situated on the base support and the second portion 404 can be situated on the mounting platform. Furthermore, it will be understood that any of the features described herein as being situated on the first portion 402 may be situated on the second portion 404 in alternative embodiments, and vice-versa.

Figure 4C:
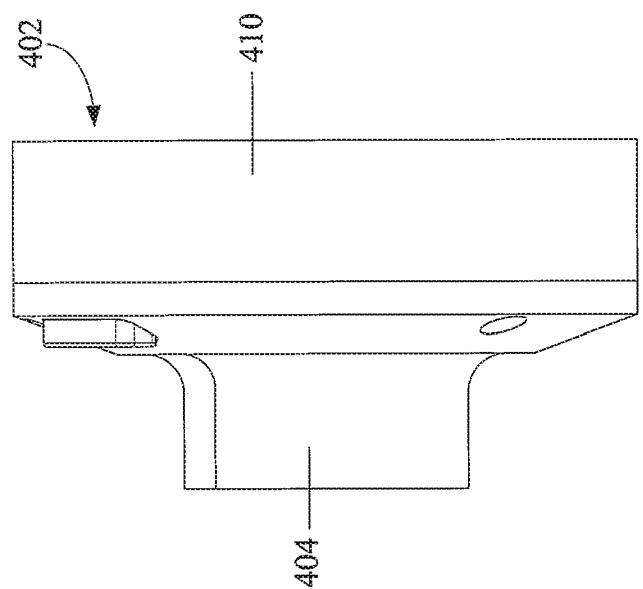
FIGS. 4C-4H illustrate various views of the coupling mechanism of FIG. 4A.
Figure 4D:
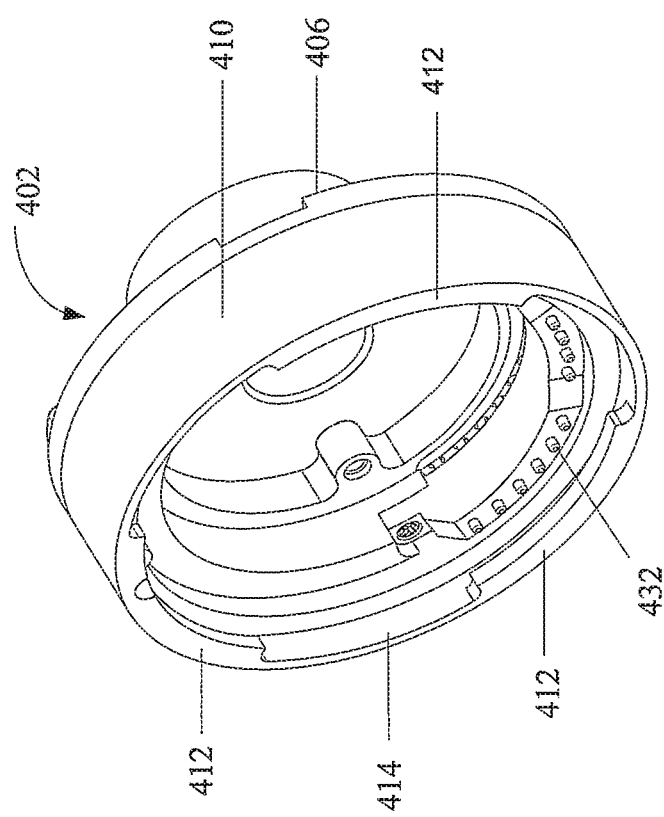
Figure 4E:
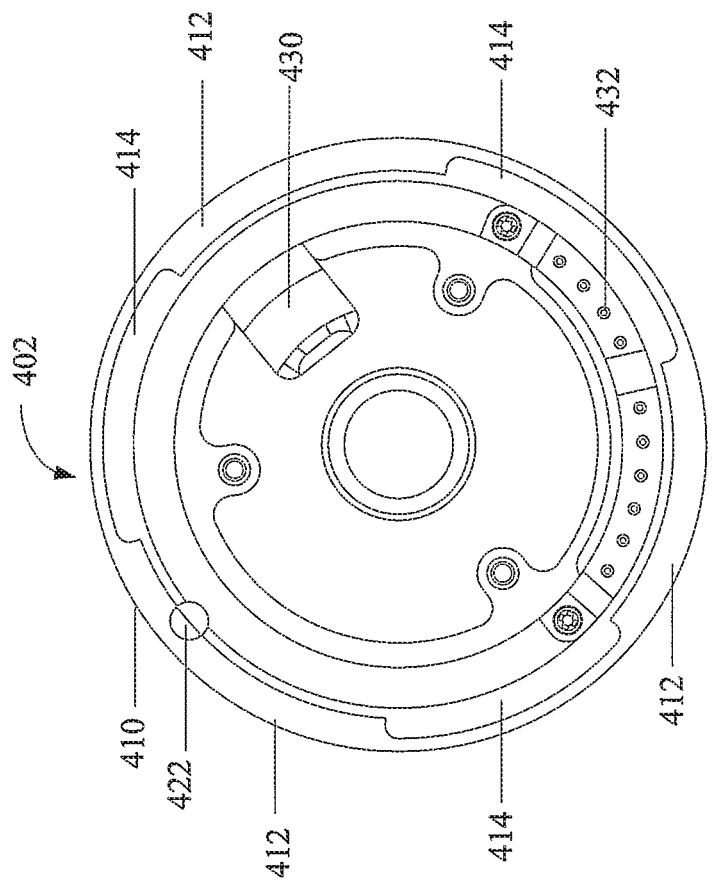
Figure 4F:
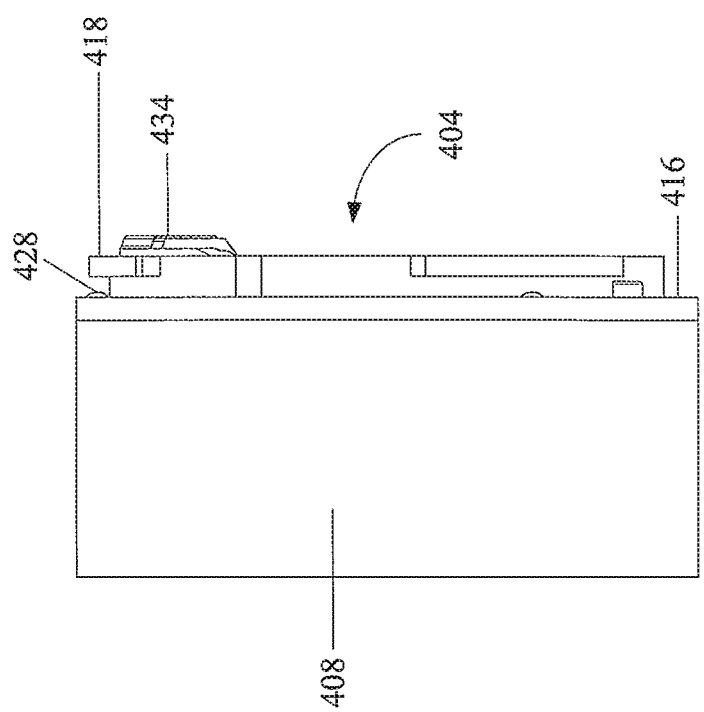
Figure 4G:
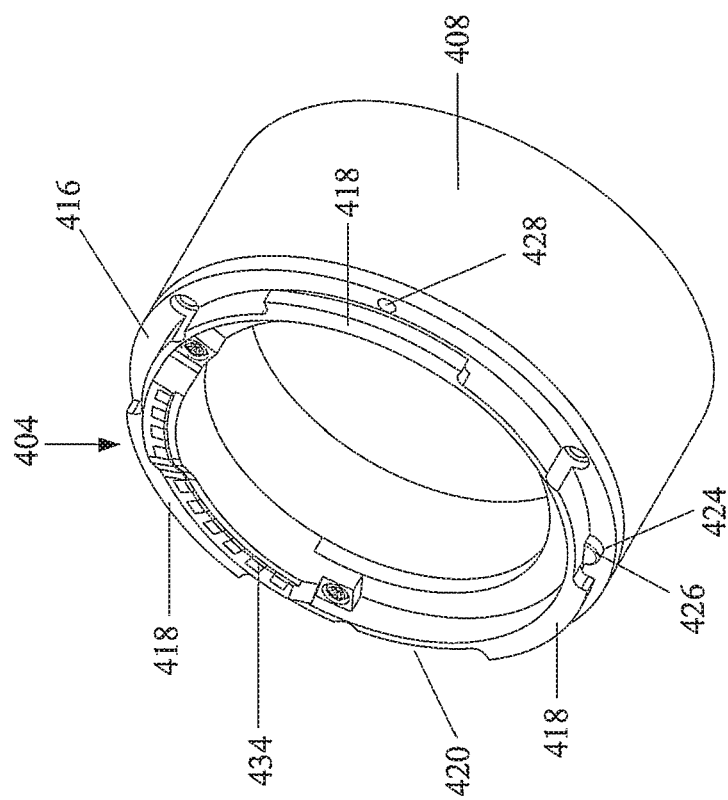
Figure 4H:
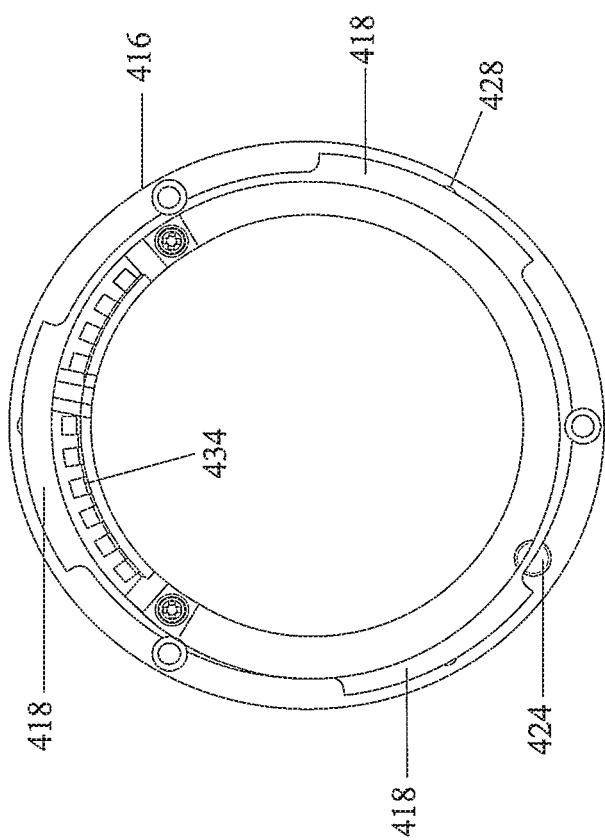

FIGS. 4C, 4D, and 4E illustrate side, perspective, and bottom views of the first portion 402, respectively. The first portion 402 can include a first cylindrical body 410 having a plurality of inner tabs 412. The inner tabs 412 can be situated along the perimeter of the bottom surface of the body 410 (the surface nearest the second portion 404) extending inwards, thereby forming a plurality of intervening gaps 414. Similarly, the second portion 406 can include a second cylindrical body 416 having a plurality of outer tabs 418. FIGS. 4F, 4G, and 4H illustrate side, perspective, and top views of the second portion 406, respectively. The outer tabs 418 can be situated along the perimeter of the upper surface of the body 416 (the surface nearest the first portion 402) extending outwards, thereby forming a plurality of intervening gaps 420. Although the first body 410 and second body 416 are depicted as each having three tabs 412, 418 and gaps 414, 420, any suitable number of tabs and gaps can be used (e.g., one, two, three, four, five, or more).

The first and second portions 402, 404 can be coupled via the tabs 412, 418 and the gaps 414, 420. The inner tabs 412 of the first portion 402 can be complementary to the gaps 420 of the second portion 406 and the outer tabs 418 of the second portion 406 can be complementary to the gaps 414 of the first portion 402. Accordingly, the first and second portions 402, 404 can be releasably coupled to each other by sliding the tabs of each portion through their complementary gaps, then rotating the portions relative to each other (e.g., clockwise or counterclockwise) so that the tabs 412 and 418 are interlocked and held against each other, thereby preventing the first and second portions 402, 404 from becoming disengaged. The process can be reversed to decouple the first and second portions 402, 404.

In some embodiments, the first and second portions 402, 404 can include mating features configured to lock the first and second portions 402, 404 together to prevent inadvertent decoupling. For example, the first body 410 can include one or more posts 422 shaped to fit within one or more complementary holes 424 of the second body 416. When the first and second portions 402, 404 are coupled as described above, the post 422 is positioned such that it is received within the hole 424, thereby constraining the movement of rotation of the first and second portions 402, 404 relative to each other. Furthermore, the hole 424 can include features configured to secure the post 422 within the hole 424, such as a first spring element 426. As another example, the second body 416 can include one or more second spring elements 428 configured to engage the first body 410 to prevent decoupling. For example, the second spring element 428 can be located at the periphery of the second body 416 underneath an outer tab 418, such that the second spring element 428 presses the inner and outer tabs 412, 418 against each other when the first and second portions 402, 404 are coupled. In a further example, the first body 410 can include a constraining element 430 configured to prevent relative rotation of the first and second bodies 410, 416 when the first and second portions 402, 404 are coupled in order to avoid inadvertent decoupling. In some instances, the element 430 can be used for routing electronic components (e.g., wires, cables, etc.) to their respective connection points.

In some embodiments, the first body 410 can include a plurality of pins 432 configured to engage corresponding contacts 434 on the second body 416 when the first and second portions 402, 404 are coupled. The pins 432 and contacts 434 can be used to electrically couple the first and second portions 402, 404, and thereby electrically couple the mounting platform and base support. The electrical coupling can be used to transmit power and/or data (e.g., payload data, control signals, etc.) between the mounting platform and base support, as previously described herein with respect to FIG. 2.

Figure 5A:
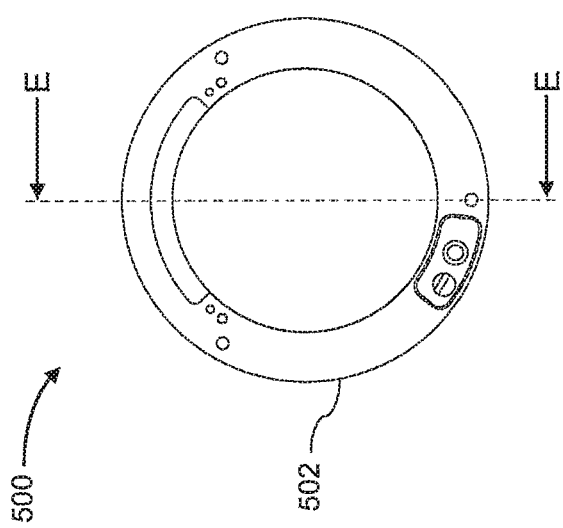
FIG. 5A illustrates a top view of another coupling mechanism for connecting a mounting platform to a base support, in accordance with embodiments.
Figure 5B:
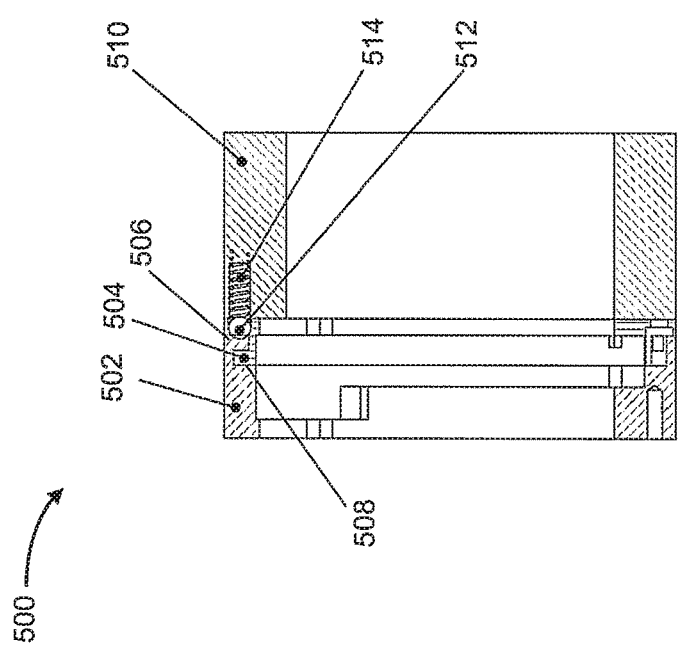
FIG. 5B is a cross-section of the coupling mechanism of FIG. 5A through line E-E.

FIGS. 5A-5B illustrate a coupling mechanism 500 for connecting a mounting platform to a base support, in accordance with embodiments. Similar to the coupling mechanism 400, the coupling mechanism 500 includes a first portion 502 and second portion 504, which may be used to couple a mounting platform to a base support via a quick release coupling mechanism. The first portion 502 can be situated on a mounting platform (e.g., a mounting assembly) and the second portion 504 can be situated on a base support, or vice-versa. The first and second portions 502, 504 can be coupled to each other by respective interlocking inner and outer tabs 506, 508. In order to increase the stability of the coupling and prevent inadvertent decoupling, a ball plunger mechanism can be used to hold the first and second portions 502, 504 together. The ball plunger mechanism can include a base 510 fitted with one or more ball plungers (e.g., ball bearing 512 coupled to spring 514.) The base 510 can be integrally formed with or coupled to the second portion 504. When the second portion 504 engages the first portion 502, the ball bearing 508 is pressed against the tab 506 of the first portion 502 by the spring 514, thereby holding the tab 506 in an interlocked position against the tab 508 of the second portion 504. Although a single ball plunger is depicted in FIG. 5B, any suitable number of ball plungers can be used (e.g., one, two, three, four, five, or more).

The features of the coupling mechanisms described herein can be used in any suitable number and combination. For example, the ball plunger mechanism of the coupling mechanism 500 can be used in combination with any components or features of the other embodiments described herein. Where desired, different coupling mechanisms can be used for different base supports. The coupling mechanisms can be adapted (e.g., with respect to size, shape, features, etc.) in order to accommodate the different morphologies of the various base supports. In some embodiments, the coupling mechanism can be selected based on anticipated movements or actions of the base support.

Figure 6A:
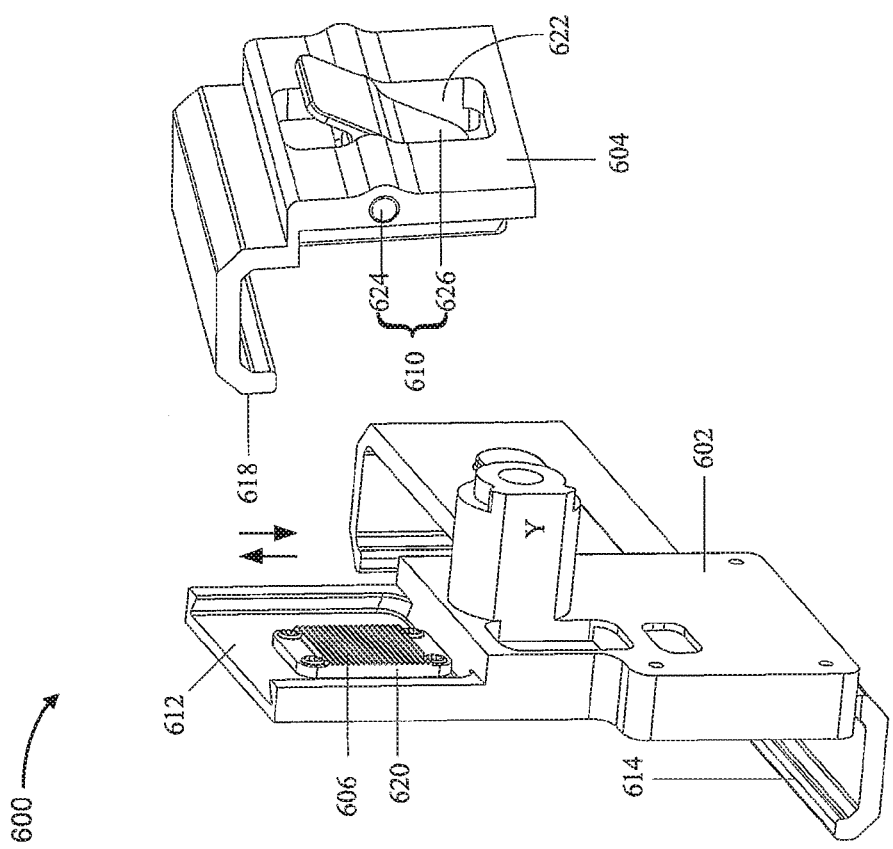
FIG. 6A-6C illustrate a payload mount for securing a payload to a mounting platform, in accordance with embodiments.
Figure 6B:
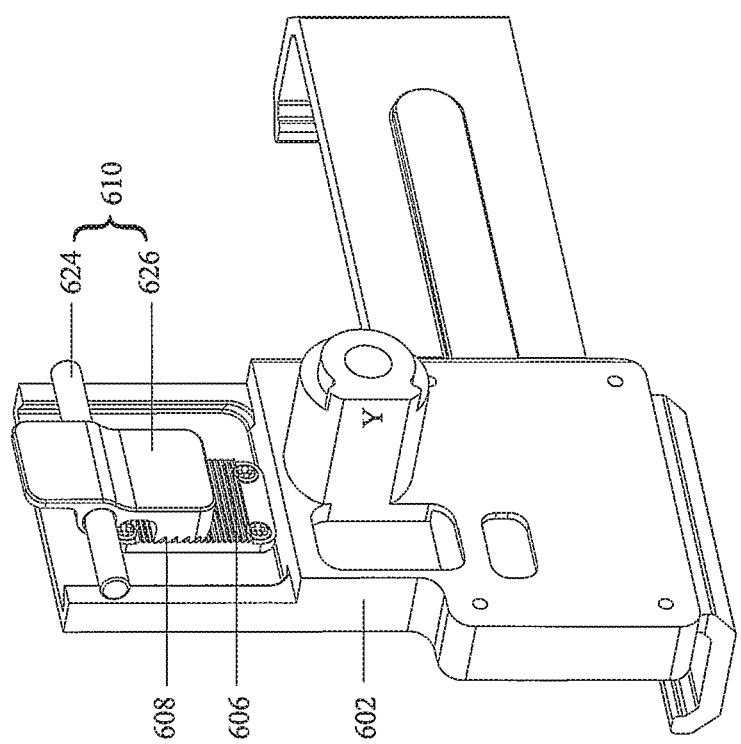
Figure 6C:
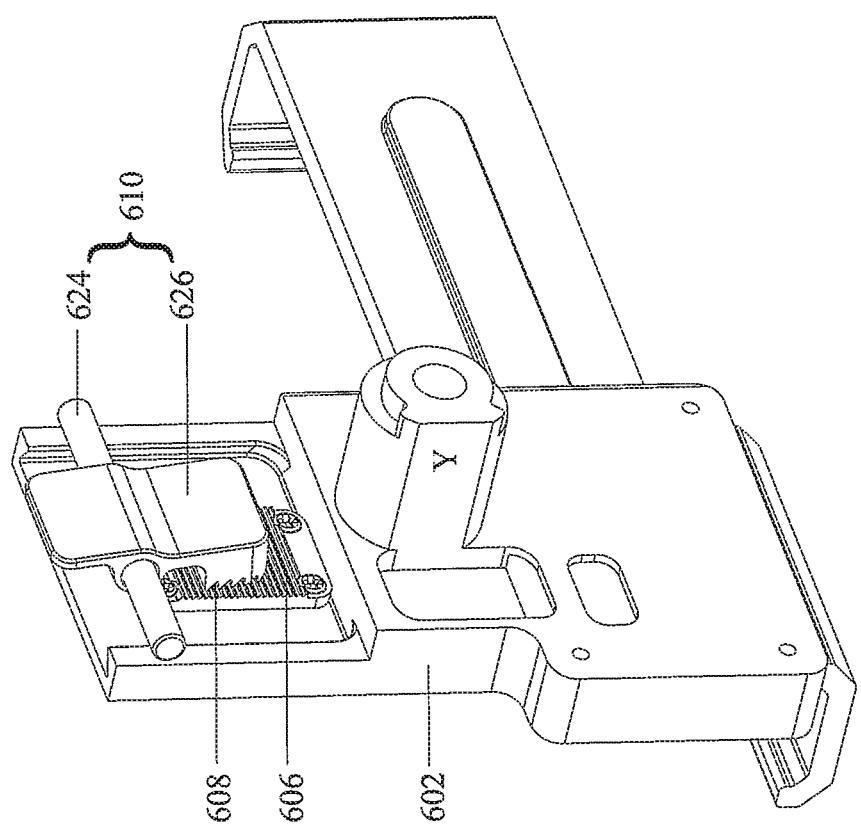
Figure 7A:
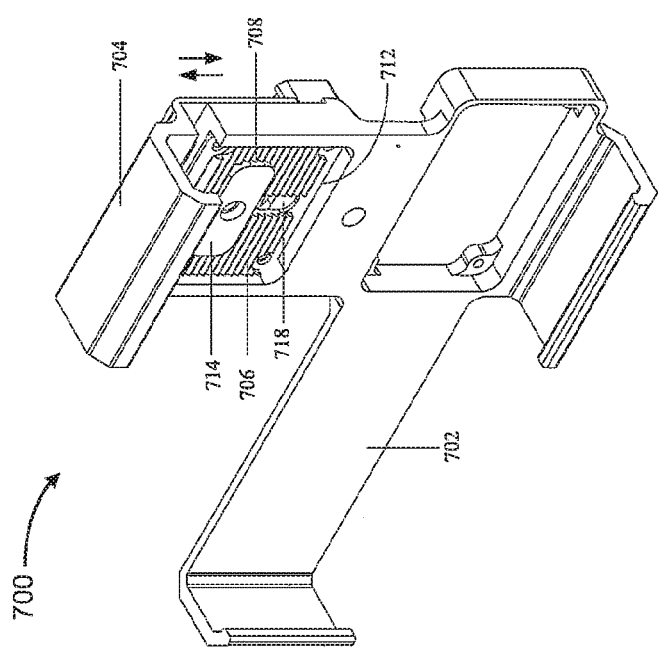
FIG. 7A-7D illustrate another payload mount for securing a payload to a mounting platform, in accordance with embodiments.
Figure 7B:
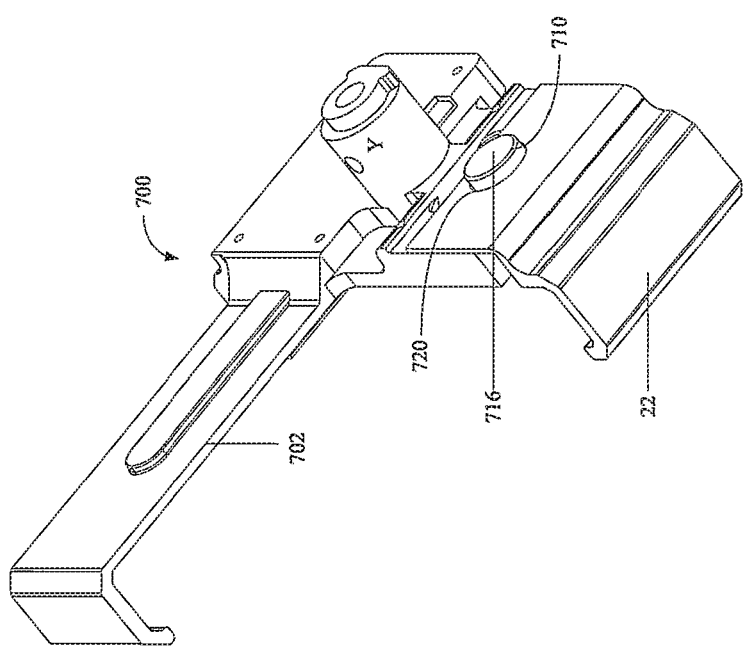
Figure 7C:
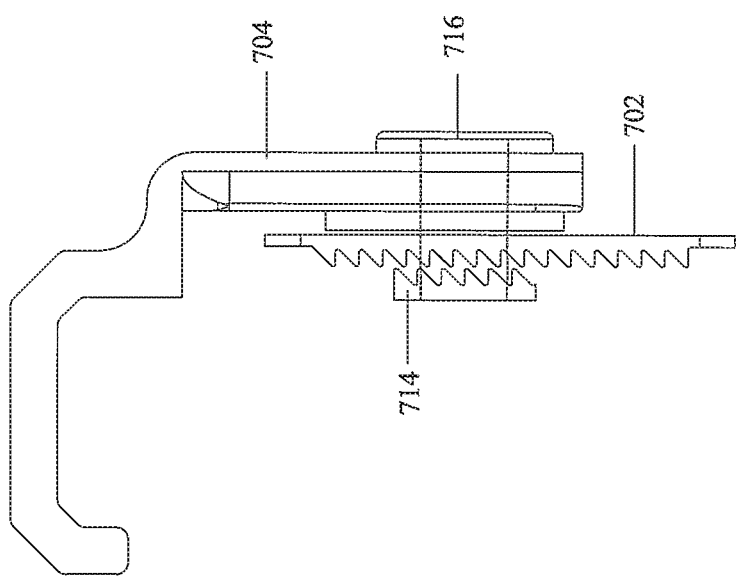
Figure 7D:
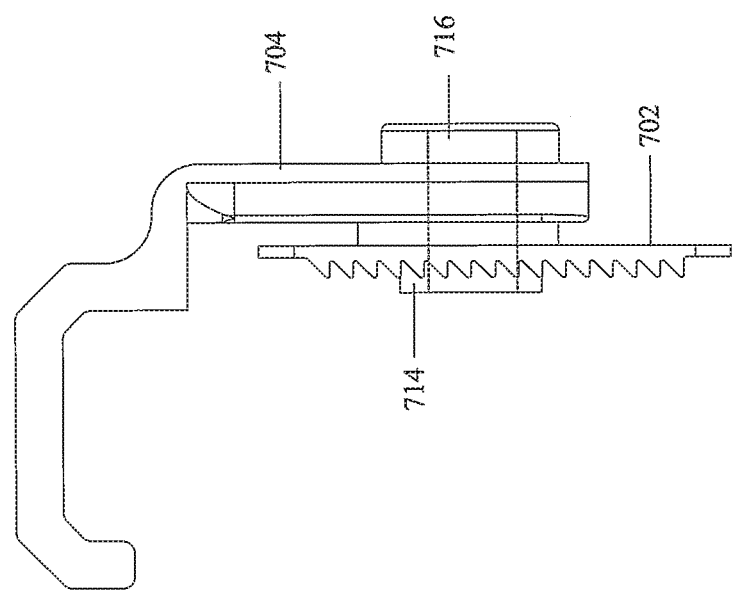

FIGS. 6A-6C illustrate a payload mount 600 for securing a payload to a mounting platform, in accordance with embodiments. The payload mount 600 can be used to releasably couple a payload, such as an imaging device (e.g., camera, smartphone, mobile device), to a support assembly (e.g., the support assembly 300). The payload mount 600 can include a first clamping portion 602, and second clamping portion 604, a first toothed section 606, a second toothed section 608, and a movable assembly 610. (Some portions of the second clamping portion 604 are omitted in FIGS. 6B, 6C for clarity). The second clamping portion 604 can be fastened to the back of the first clamping portion 602 to form an adjustable mount 600 for securing a payload. The first clamping portion 602 can include a channel 612 shaped to receive the second clamping portion 604 such that the second clamping portion 604 can slide with respect to the first clamping portion (e.g., along the directions indicated by the arrows), thereby enabling a user to adjust the spacing between the clamping jaws 614, 618 in order to secure and/or release a payload. The teeth of the first toothed section 606 can be configured to engage the teeth of the second toothed section 608, thereby securing the first and second clamping portions 602, 604 to each other.

The first toothed section 606 can be situated on a plate 620 fastened within the channel 612 of the first clamping portion 602 (e.g., using screws, nails, pins, etc.). Alternatively, the first toothed section 606 can be integrally formed within the channel 612 the first clamping portion 602, such that the plate 620 is not required. The second clamping portion 604 can include an aperture 622. The movable assembly 610, which includes a rod 624 passing through a lever body 626, can be received within the aperture 622. The ends of the rod 624 can be fixedly coupled to the second clamping portion 604 at the two sides of the aperture 622, thereby permitting the lever body 626 to pivot within the aperture 622. The second toothed section 608 can be situated on the lever body 626 (e.g., integrally formed with the lever body 626) in a position engaging the first toothed section 606. The intermeshing of the teeth of toothed sections 606, 608 can secure the first and second clamping portions 602, 604 at a fixed spatial disposition relative to each other, thereby preventing inadvertent loosening of the clamping jaws 614, 618.

In some embodiments, the movable assembly 610 can be spring-loaded to bias the position of the lever body 626 in order to maintain the engagement between the toothed sections 606, 608. To separate the clamping jaws 614, 618 (e.g., to release a payload, prepare for mounting a payload, or adjust the spacing between the jaws), the user can press on the upper end of the lever body 626, thereby pivoting the lever body 626 to separate the toothed sections 606, 608 and allow the second clamping portion 604 to slide within the channel 612 of the first clamping portion 602.

FIGS. 7A-7D illustrate a payload mount 700 for securing a payload to a mounting platform, in accordance with embodiments. Similar to the payload mount 600, the payload mount 700 includes a first clamping portion 702, a second clamping portion 704, a first toothed section 706, a second toothed section 708, and a movable assembly 710. (Some portions of the first clamping portion 702 are omitted in FIGS. 7C, 7D for clarity). The second clamping portion 704 can be fastened to the back of the first clamping portion 702 to form an adjustable mount 700 for securing a payload. In some embodiments, the size of the mount 700 can be adjusted by sliding the second clamping portion 704 relative to the first clamping portion 702 (e.g., along the directions indicated by the arrows). The teeth of the first toothed section 706 can be configured to engage the teeth of the second toothed section 708, thereby securing the first and second clamping portions 702, 704 to each other.

The first toothed section 706 can be situated within the channel 712 formed in the first clamping portion 702. The first toothed section 706 can be integrally formed with the first clamping portion 702, or situated on a plate fastened within the channel 712 of the first clamping portion 702. The movable assembly 710 can include a plate 714 and a button 716, with the second toothed section 708 situated on the plate 714 in a position engaging the first toothed section 706. The plate 714 and button 716 can be fixedly coupled to each other by a shaft (not shown). The shaft can pass through first and second apertures 718, 720 situated in the first and second clamping portions 702, 704, respectively, such that the first and second clamping portions 702, 704 are positioned between the plate 714 and button 716.

The button 716 can be actuated to move the plate 714 towards or away from the first clamping portion 702, thereby causing the second toothed portion 708 to be engaged with or separated from the first toothed section 706, respectively. For example, when the button 716 is depressed, the disengagement of the first and second toothed sections 706, 708 enables the user to adjust the positioning of the second clamping portion 704 relative to the first clamping portion 702. Conversely, when the button 716 is released, the first and second toothed sections 706, 708 are intermeshed and prevent relevant movement of the first and second clamping portions 702, 704. In some embodiments, the movable assembly 710 can include one or more spring elements joining the button 716, connecting shaft, and plate 714, thereby biasing the position of the plate 714 to maintain the engagement of the first and second toothed sections 706, 708.

The embodiments of the payload mounts 600, 700 described herein permit easy coupling and decoupling of the payload while avoiding issues of material fatigue associated with existing spring-based mounts. Where desired, different payload mounts can be used for different payloads. Alternatively, a single payload mount can be used for different payloads, with the positioning of the clamping portions being adjusted to accommodate each payload. Additionally, it shall be understood that although the payload mounts 600, 700 are depicted herein as utilizing intermeshing toothed sections, other types of complementary features can also be used to couple the clamping portions of the mounts 600, 700 to each other. For example, the first and second clamping portion of the mounts described herein can include any number and combination of mating protrusions and indentations suitable for securing the relative positions of the clamping portions. Furthermore, the payload mounts can be used in conjunction with any of the mounting platforms described herein (e.g., the mounting platform 200). In some embodiments, the payload mounts 600, 700 can be coupled to a mounting platform via suitable fastening features, such as fastening features (e.g., screw threads, interlocking elements) situated on the region Y and configured to engage complementary fastening features on the mounting platform. The payload mount can be fixedly coupled or releasably coupled to the mounting platform, and the orientation of the payload mount (and therefore the payload) can be controlled by the mounting platform, as previously described herein.

Figure 8:
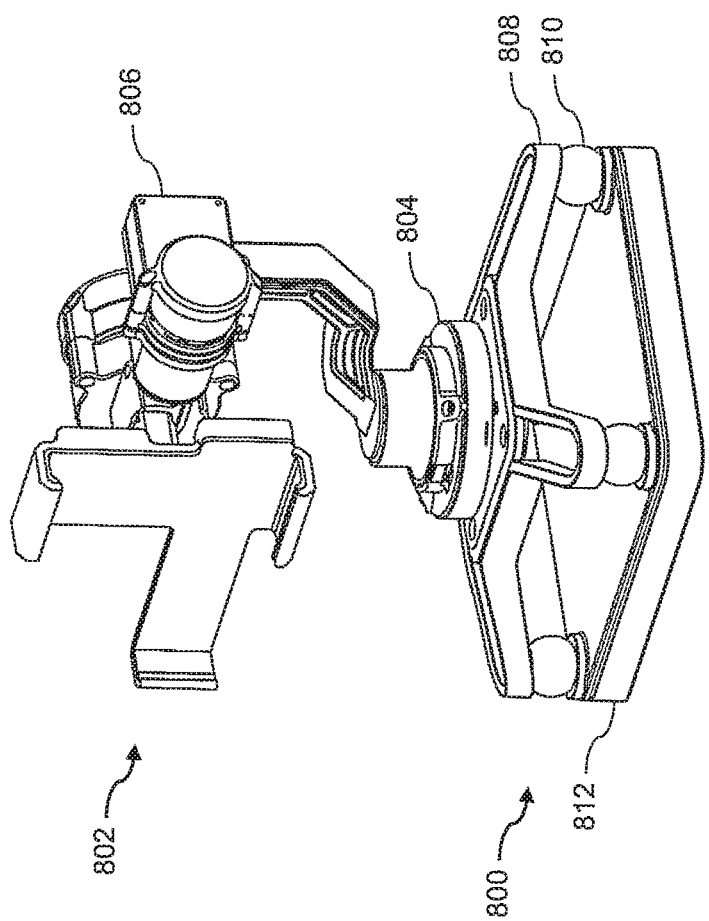
FIG. 8 illustrates a base adapter for mounting on a movable object, in accordance with embodiments.

FIG. 8 illustrates a base adapter 800 for mounting on a movable object, in accordance with embodiments. The base adapter 800 can be a base support for a mounting platform 802. The mounting platform 802 may include a mounting assembly 804 and support assembly 806, and can be used to support a payload, as described elsewhere herein. The base adapter 800 can be any element or combination of elements suitable for mounting onto a movable object, such as a rack, frame, holder, mount, cradle, bracket, plate, or tripod. For example, as depicted in FIG. 8, the base adapter 800 can include a stand 808, a plurality of vibration dampers 810, and a base plate 812. Where desired, the base adapter 800 can be outfitted with a protective cover, which may protect the payload, mounting platform 802, and/or base adapter 800 from the environment (e.g., a waterproof cover). In some embodiments, the protective cover can be a spherical or hemispherical shape.

The base adapter 800 can be operably coupled to the mounting platform 802 and/or a payload supported by the mounting platform 802, such that the base adapter 800 can communicate power and/or data to the mounting platform 802 and/or payload. Furthermore, the base adapter 800 can include any of the components previously described herein with respect to the base support 200 of FIG. 2 (e.g., power source, controller, memory, display, communication module). Any of the functionalities described herein with respect to the base support 200 can be applied to the base adapter 800.

The base adapters described herein can be used in conjunction with any type of movable object, such as ground vehicles, aerial vehicle, water vehicles, or any other movable object described herein. For example, the base adapter 800 can be mounted onto an automobile. The base adapter 800 can be permanently affixed to the movable object. Alternatively, the base adapter 800 can be releasably coupled to the movable object. Exemplary couplings may utilize adhesives, bonding, welding, fasteners, clamps, ropes, suction cups, and the like. In some instances, the base adapter 800 can be electrically coupled to the movable object, such that the base adapter is capable of communicating data and/or power to the movable object. For example, the base adapter 800 may receive data from the payload and transmit the data to the movable object. As another example, the base adapter 800 may transmit power from a power supply of the movable object to the mounting platform 802 and/or the payload. In a further example, the base adapter 800 may receive control signals from the movable object and transmit the control signals to the payload and/or mounting platform 802 to control a functionality thereof.

In some embodiments, the base adapters described herein can be configured to be worn by a movable object that is a living being. The living being can be a human or an animal. Such wearable base adapters can be worn directly by the living being, or can be coupled to an object worn by the living being (e.g., a helmet, an article of clothing, a backpack, a harness, etc.) using any of the coupling techniques disclosed herein. The wearable base adapter can be worn on any portion of the body, such as the head, arms, hands, legs, feet, shoulders, back, chest, hips, or torso, or suitable combinations thereof.

Figure 9:
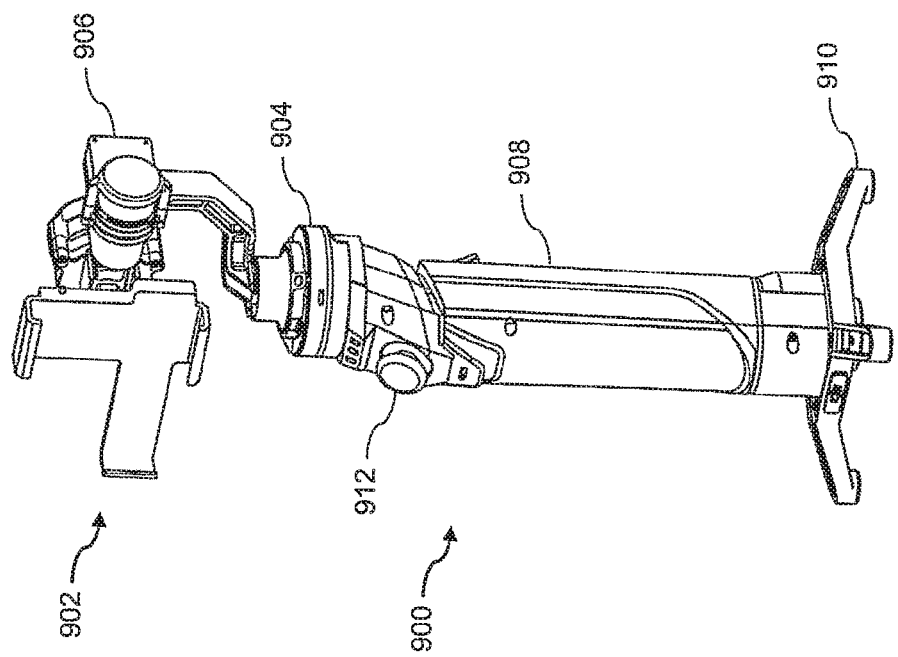
FIG. 9 illustrates a handheld support, in accordance with embodiments.

FIG. 9 illustrates a handheld support 900, in accordance with embodiments. The handheld support 900 can be a base support for a mounting platform 902. The mounting platform 902 may include a mounting assembly 904 and support assembly 906 for supporting a payload, as described elsewhere herein. The handheld support 900 can be configured to enable the mounting platform 902 and a payload coupled to the mounting platform 902 to be supported by a hand (or a pair of hands). In some embodiments, the handheld support 900 can include a support member, such as grip or handle 908, which can have a suitable size (e.g., length, width, thickness, diameter), weight, or shape (e.g., an ergonomic shape) for being held by a hand. For example, the length of the handle 908 may be less than or equal to about 10 cm, 11 cm, 12 cm, 13 cm, 14 cm, 15 cm, 16 cm, 17 cm, 18 cm, 19 cm, 20 cm, 25 cm, 30 cm, 40 cm, or 50 cm. Conversely, the length of the handle 908 may be greater than or equal to about 5 cm, 10 cm, 11 cm, 12 cm, 13 cm, 14 cm, 15 cm, 16 cm, 17 cm, 18 cm, 19 cm, 20 cm, 25 cm, 30 cm, or 40 cm. The width of the handle 908 may be less than the length. For example, the width of the handle 908 may be less than or equal to about 1 cm, 2 cm, 3 cm, 4 cm, 5 cm, 6 cm, 7 cm, 8 cm, 9 cm, or 10 cm. Alternatively, the width of the handle 908 may be greater than or equal to about 0.5 cm, 1 cm, 2 cm, 3 cm, 4 cm, 5 cm, 6 cm, 7 cm, 8 cm, or 9 cm. The diameter of the handle 908 may be less than or equal to about 0.5 cm, 1 cm, 1.5 cm, 2 cm, 2.5 cm, 3 cm, 3.5 cm, 4 cm, 4.5 cm, or 5 cm. In some instances, the diameter of the handle 908 may be greater than or equal to about 0.5 cm, 1 cm, 1.5 cm, 2 cm, 2.5 cm, 3 cm, 3.5 cm, 4 cm, 4.5 cm, or 5 cm. The weight of the handle 908 may be less than or equal to about 10 g, 25 g, 50 g, 100 g, 200 g, 300 g, 400 g, 500 g, 600 g, 700 g, 800 g, 900 g, 1 kg, 1.5 kg, or 2 kg.

In some embodiments, the handle 908 may include a stand 910, which may be a structure capable of independently supporting the handheld support 900 when placed on a surface. For example, the stand 910 can be positioned at or near the proximal end of the handle 908, thereby enabling the handheld support 900 to be independently supported in a vertical position. Alternatively, suitable support elements can be placed on other portions of the handle 908 and may enable the handheld support 900 to be independently supported in other orientations (e.g., horizontal). Furthermore, in some embodiments, the handheld support 900 can include a protective cover (e.g., a waterproof cover), which may cover some or all portions of the handle 908, mounting platform 902, and/or a coupled payload.

The handle 908 may include an input interface 912. The input interface 912 is depicted in FIG. 9 as a joystick, but may alternatively or additionally include buttons, keyboards, touch screens, and the like. The input interface may be positioned on the handle 908 in a manner easily accessible by the fingers of the user. For example, the input interface may be positioned near the distal end of the handle 908 (which may refer to the end of the handle 908 closest to the mounting platform 904), near the proximal end of the handle, or approximately in the middle of the handle. In some embodiments, different elements of the input interface 912 may be situated on different portions of the handle 908. For example, some elements may be located near the proximal end, while other elements may be located near the distal end. As previously mentioned, the input interface 912 may be used to input control signals for controlling the support assembly 906 and/or the payload, as well as other functionalities of the handheld support 900. For example, the control signals can be used to control an imaging device (e.g., a camera, smartphone, or other imaging-enabled mobile device) coupled to the mounting platform 902. The control signals can adjust the position and/or orientation of the imaging device via the support assembly 906, as previously described herein. In some embodiments, the control signals can control a function of the imaging device, such as a record function, zoom in function, zoom out function, power on function, power off function, change of focus function, change of field of view function, and so on.

The handheld support 900 can be operably coupled to the mounting platform 902 and/or a payload supported by the mounting platform 902, such that the handheld support 900 can communicate power and/or data to the mounting platform 902 and/or payload. Furthermore, the base adapter 900 can include any of the components previously described herein with respect to the base support 200 of FIG. 2 (e.g., power source, controller, memory, display, communication module). Any of the functionalities described herein with respect to the base support 200 can be applied to the base adapter 900. Furthermore, any of these functionalities can be controlled by a user via the input interface 912.

Figure 10:
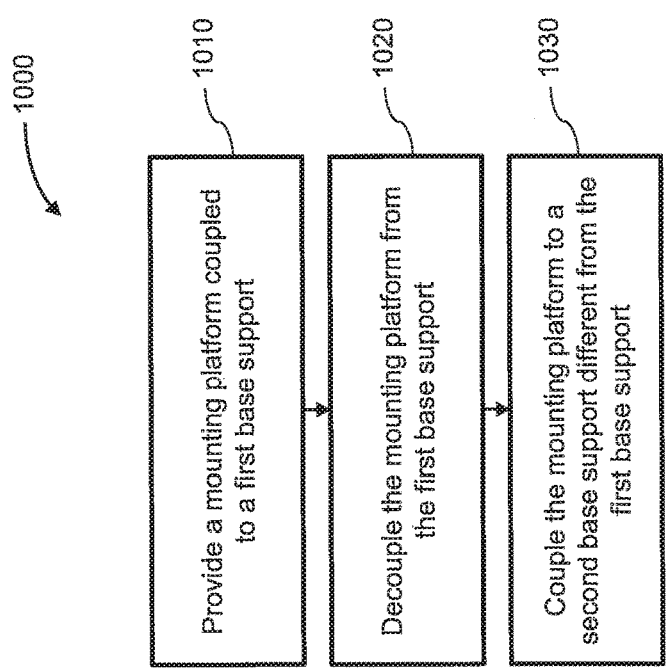
FIG. 10 is a schematic illustration by way of block diagram depicting a method for interchangeably mounting a payload, in accordance with embodiments.

FIG. 10 is a schematic illustration depicting a method 1000 for interchangeably mounting a payload, in accordance with embodiments. The method 1000 can be practiced using any of the system and devices described herein.

In step 1010, a mounting platform coupled to a first base support is provided. The mounting platform can be any embodiment of the platforms described herein, and can be releasably mechanically and electrically coupled to a suitable payload. The first base support can be any embodiment of the base supports described herein. For example, a mounting platform supporting an imaging device can be provided coupled to a UAV. In some instances, the mounting platform can be coupled to the first base support via a releasable electrical and mechanical coupling (e.g., coupling mechanism 400) enabling data transmission between the payload and the first base support.

In step 1020, the mounting platform is decoupled from the first base support. For example, the mounting platform supporting the imaging device can be decoupled from the UAV. The decoupling may involve disengaging interlocking coupling mechanisms, as previously described herein. In some embodiments, the decoupling can be performed without removing the payload from the mounting platform. Alternatively, the payload can be removed from the mounting platform prior to decoupling the base support.

In step 1030, the mounting platform is coupled to a second base support different from the first base support. The second base support can be any embodiment of the base supports described herein. For example, the mounting platform supporting the imaging device, once decoupled from the UAV, can be coupled to a handheld support. The mounting platform can also be coupled to the second base support via a releasable electrical and mechanical coupling, such as a coupling enabling data transmission between the payload and the second base support (e.g., coupling mechanism 400).

Figure 11A:
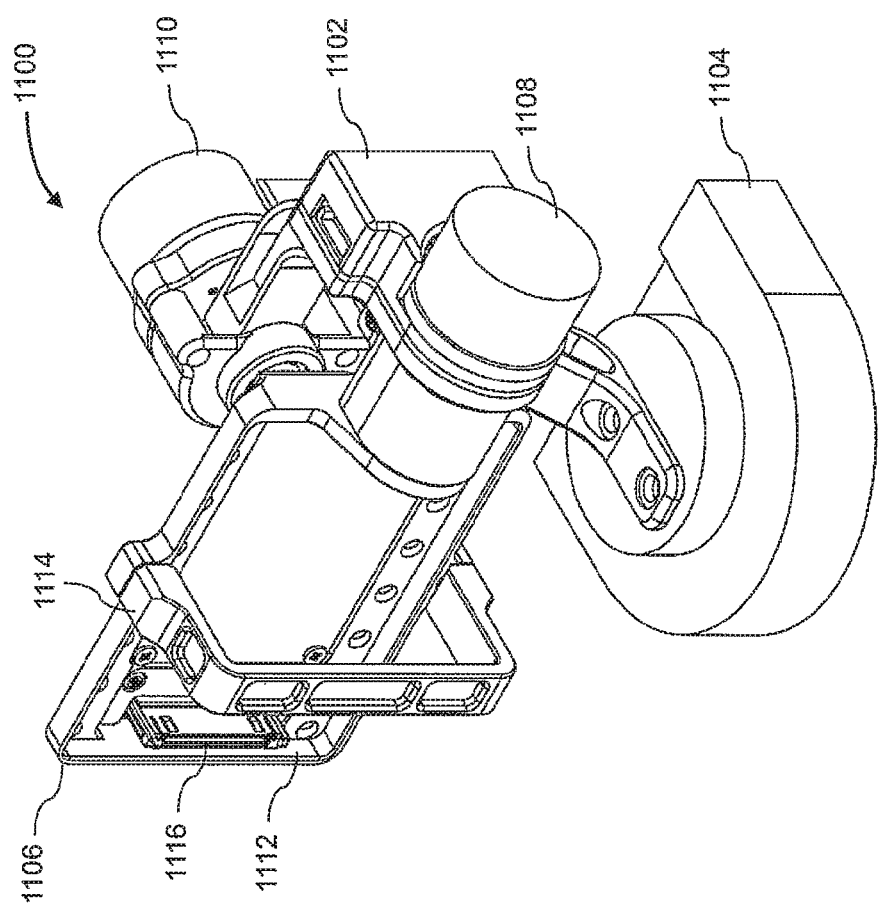
FIG. 11A illustrates a perspective view of a mounting platform, in accordance with embodiments.
Figure 11C:
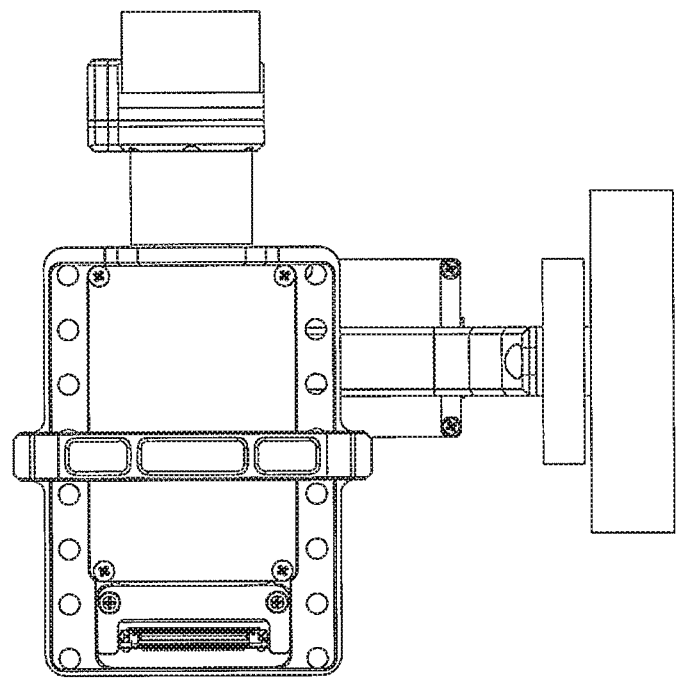
FIG. 11C illustrates a front view of the mounting platform of FIG. 11A, in accordance with embodiments.
Figure 11B:
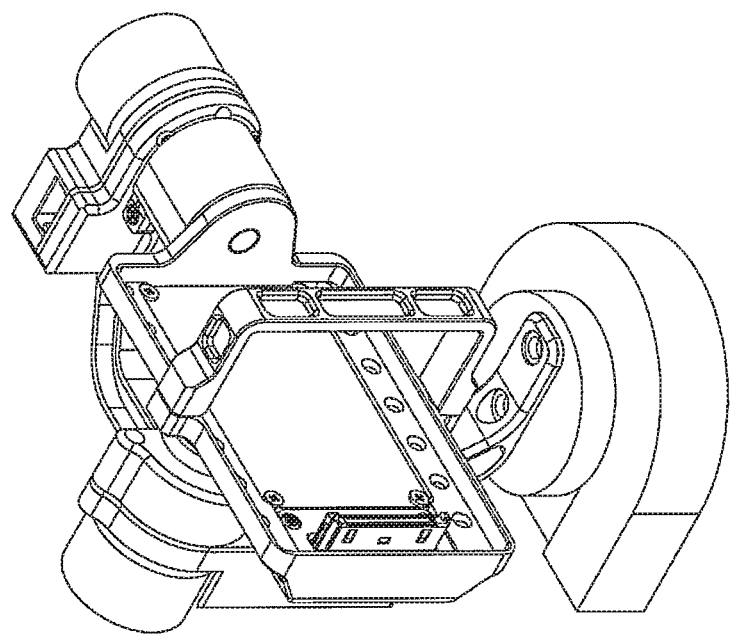
FIG. 11B illustrates another perspective view of the mounting platform of FIG. 11A, in accordance with embodiments.
Figure 11E:
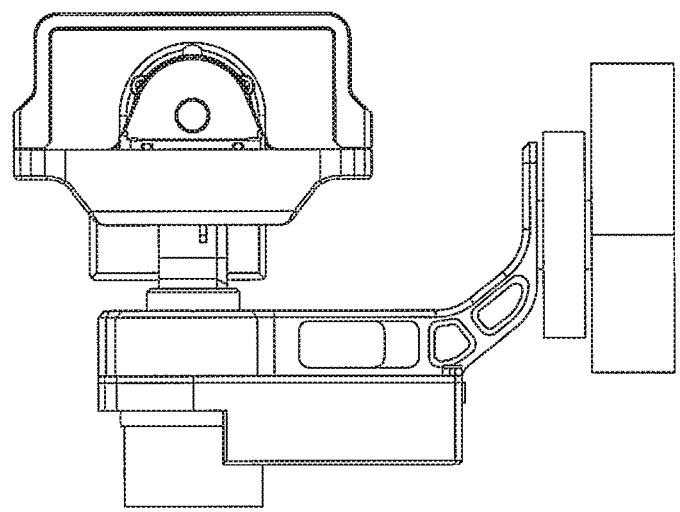
FIGS. 11D and 11E illustrate side view of the mounting platform of FIG. 11A, in accordance with embodiments.
Figure 11D:
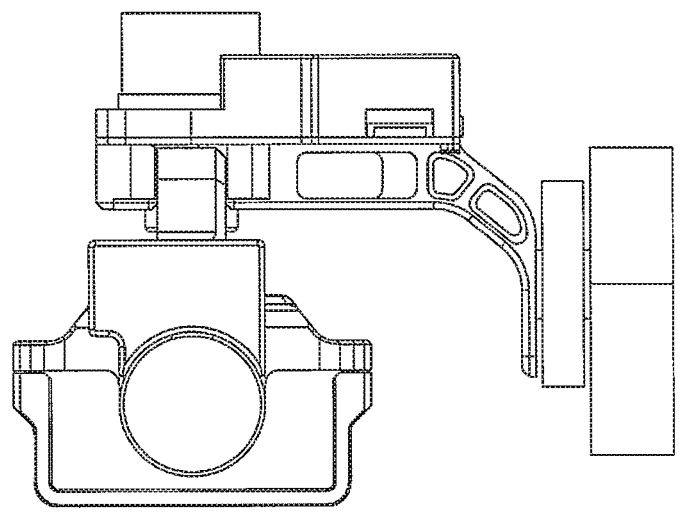
Figure 11F:
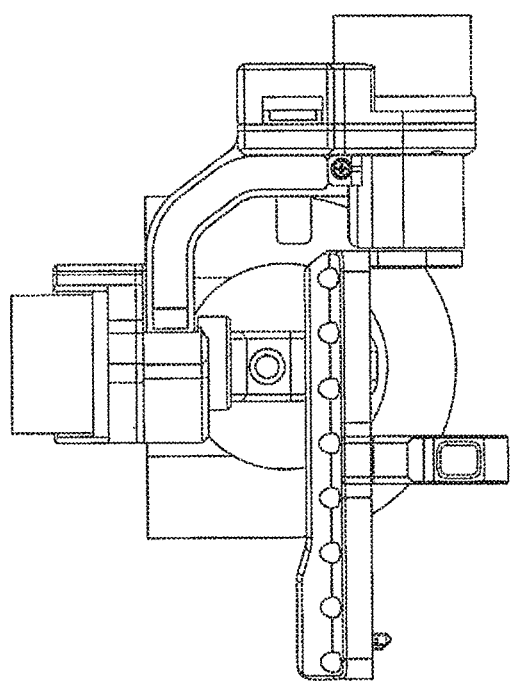
FIG. 11F illustrates a top view of the mounting platform of FIG. 11A, in accordance with embodiments.

FIGS. 11A through 11L illustrate a mounting platform 1100, in accordance with embodiments. FIG. 11A illustrates a perspective view of the mounting platform 1100 (see also FIGS. 11B through 11F). The platform 1100 can include a support assembly 1102 and a mounting assembly 1104. The support assembly 1102 can include a payload mount 1106, a first orientation control unit 1108, and a second orientation control unit 1110. The payload mount 1106 can be used to a secure a payload. For instance, the payload mount 1106 can include a base plate 1112 and a bracket 1114 for securing the payload against the base plate 1112. The bracket 1114 can be removably coupled to the base plate 1112 so as to enable a payload to be removably mounted within the payload mount 1106. Optionally, the base plate 1112 can include an electrical interface 1116 enabling the payload to be electrically coupled to the payload mount 1106.

The first orientation control unit 1108 can be configured to rotate the payload mount 1106 and coupled payload about a first axis of rotation, and the second orientation control unit 1110 can be configured to rotate the first orientation control unit 1108, payload mount 1106, and payload about a second axis of rotation. Accordingly, the support assembly 1102 can be used to rotate a payload with respect to up to two axes of freedom. The two axes of freedom can be orthogonal axes. In some instances, the axes can intersect. The rotations produced by the first and second orientation control units 1108, 1110 can be actuated by suitable actuation units (e.g., motors), as previously described herein.

Figure 11G:
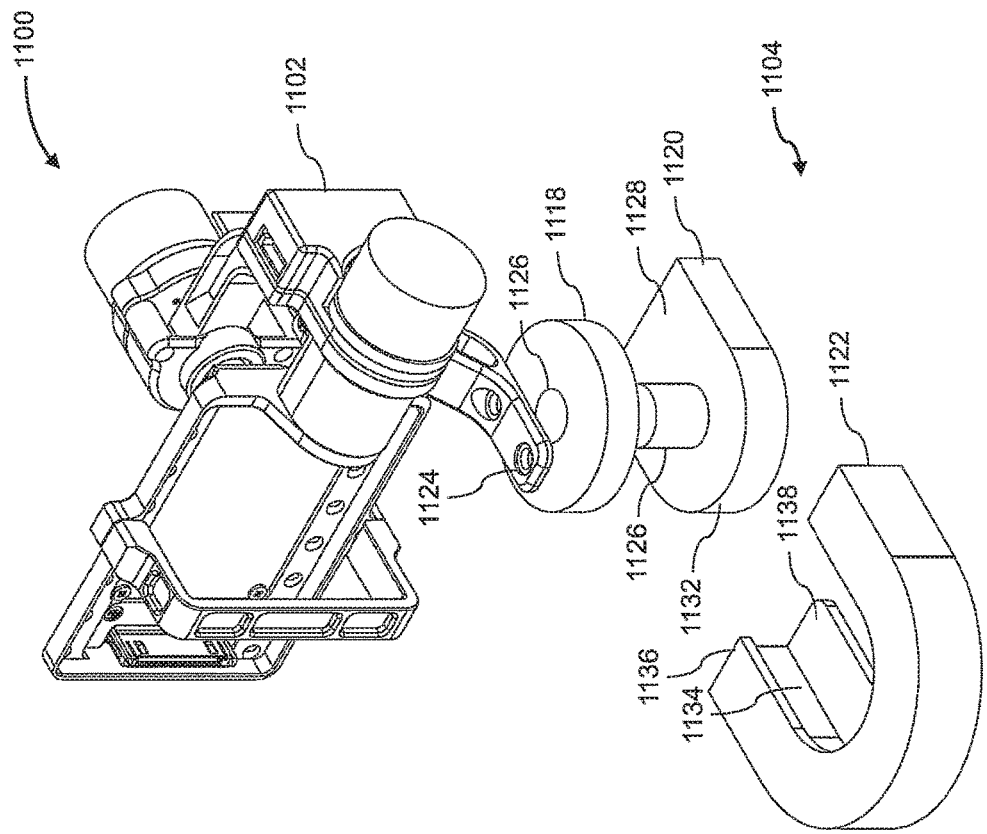
FIG. 11G illustrates an exploded perspective view of the mounting platform of FIG. 11A, in accordance with embodiments.
Figure 11I:
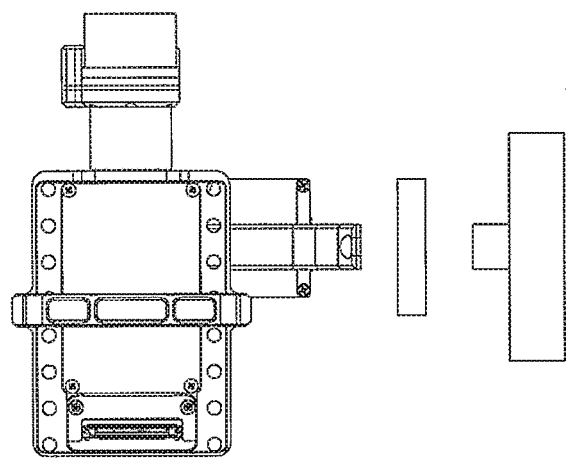
FIG. 11I illustrates an exploded front view of the mounting platform of FIG. 11A, in accordance with embodiments.
Figure 11H:
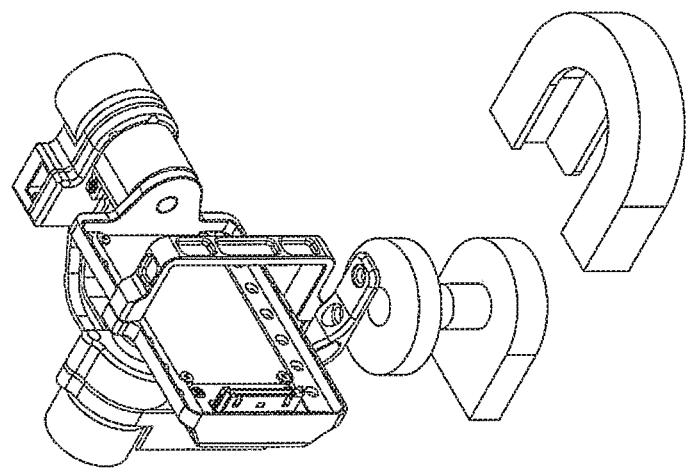
FIG. 11H illustrates another exploded perspective view of the mounting platform of FIG. 11A, in accordance with embodiments.
Figure 11K:
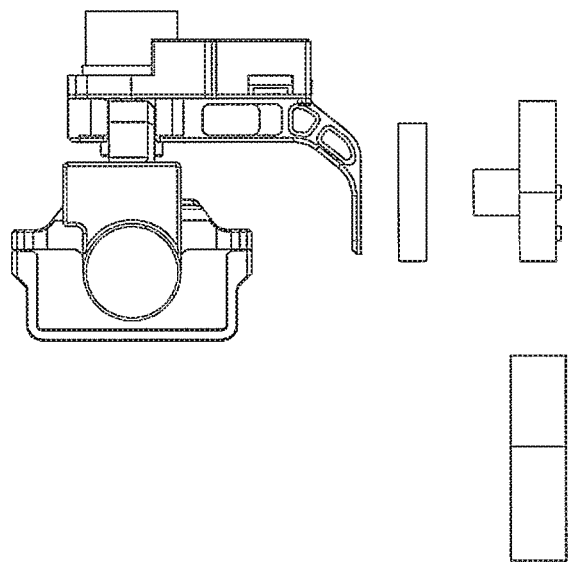
FIGS. 11J and 11K illustrates exploded side views of the mounting platform of FIG. 11A, in accordance with embodiments.
Figure 11J:
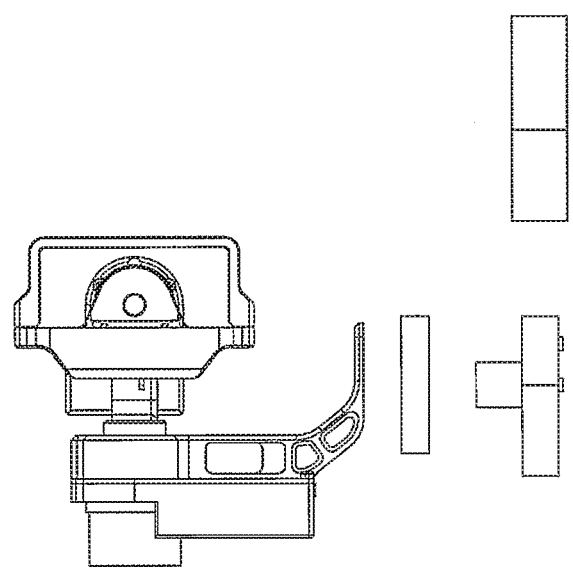

FIG. 11G illustrates an exploded view of the mounting platform 1100 (see also FIGS. 11H through 11K). The mounting assembly 1104 of the platform 1100 can include a first portion 1118, a second portion 1120, and a mounting base 1122. The first portion 1118 can be coupled to the support assembly 1102 using one or more fasteners, such as via screws inserted through screw holes 1124. In some instances, the first portion 1118 can be shaped as a cylinder or disk having a central hole 1126. The second portion 1120 can include a base 1128 and a post 1130 extending perpendicularly upwards from the base 1128. The post 1130 can be shaped to be received within the hole 1126 of the first portion 1118, thereby enabling the first and second portions 1118, 1120 to be coupled together (e.g., permanently or releasably coupled). The base 1128 of the second portion 1120 can include a curved portion 1132, such that the base 1128 forms a U shape.

The mounting base 1122 can include a cavity 1134 complementary to the shape of the base 1128, such as U-shaped cavity. Accordingly, the base 1128 can be slid into the cavity 1134 so as to couple the second portion 1120 to the mounting base 1122. Optionally, the mounting base 1122 can include walls 1136, 1138 surrounding the cavity 1134 so as to secure the base 1128 within the cavity 1134 and prevent it from moving upwards or downwards relative to the mounting base 1122. In some instances, the mounting base 1122 can be situated on any of the base supports described herein, such that the support assembly 1102 can be engaged to the base support via the coupling between the first and second portions 1118, 1120 to do the mounting base 1122. The coupling can be a releasable coupling, such as a releasable coupling incorporating any of the coupling mechanisms previously described herein. In some instances, the coupling can enable the mounting platform 1100 to be interchangeably coupled to a plurality of different types of base supports (e.g., movable object such as a UAV, base adapter, handheld support), similar to the other embodiments described herein.

Figure 12B:
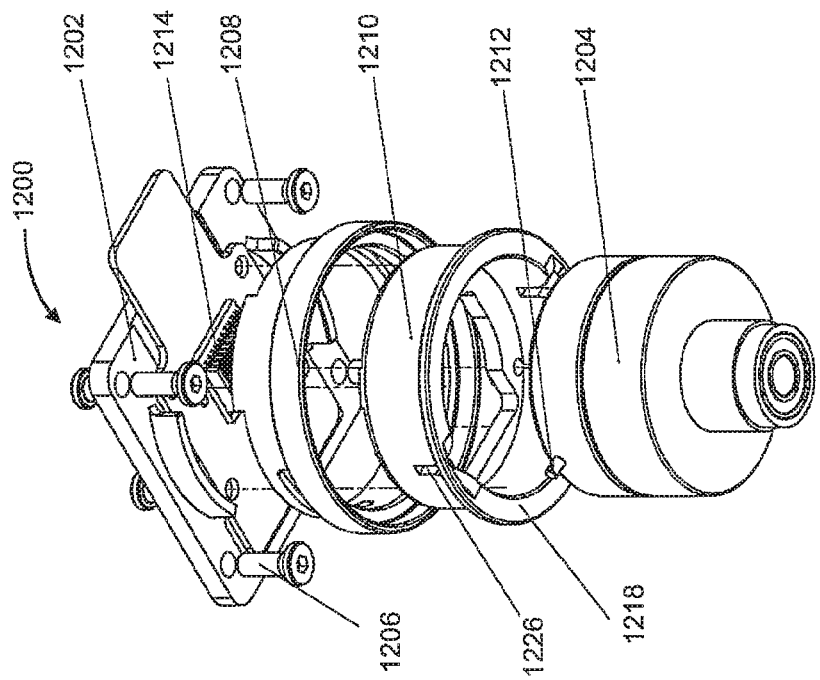
FIGS. 12A and 12B illustrate exploded perspective views of a coupling mechanism for connecting a mounting platform to a base support, in accordance with embodiments.
Figure 12A:
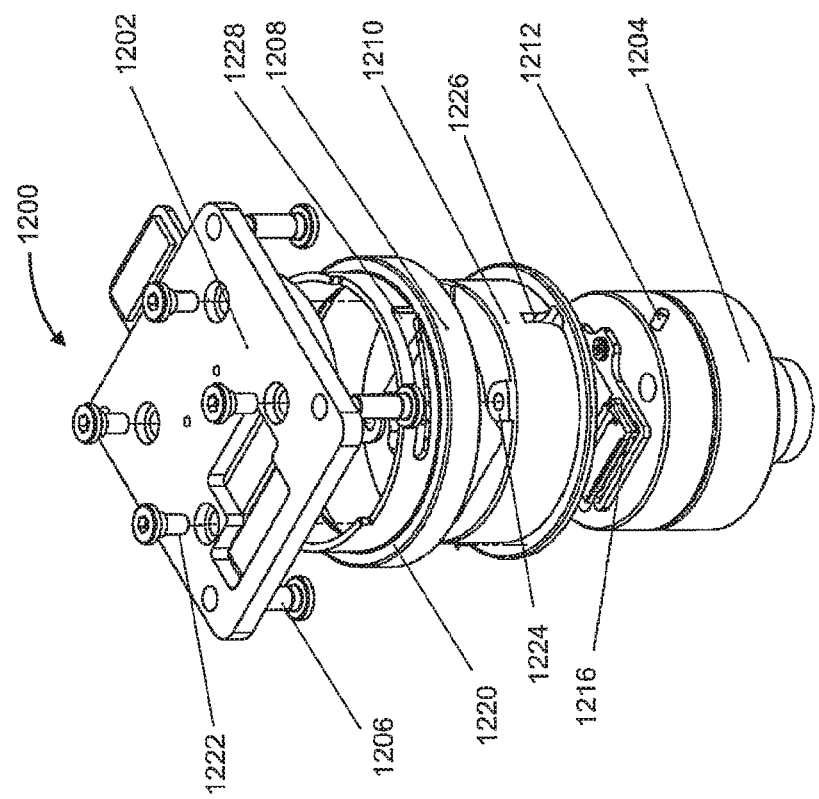
Figure 12D:
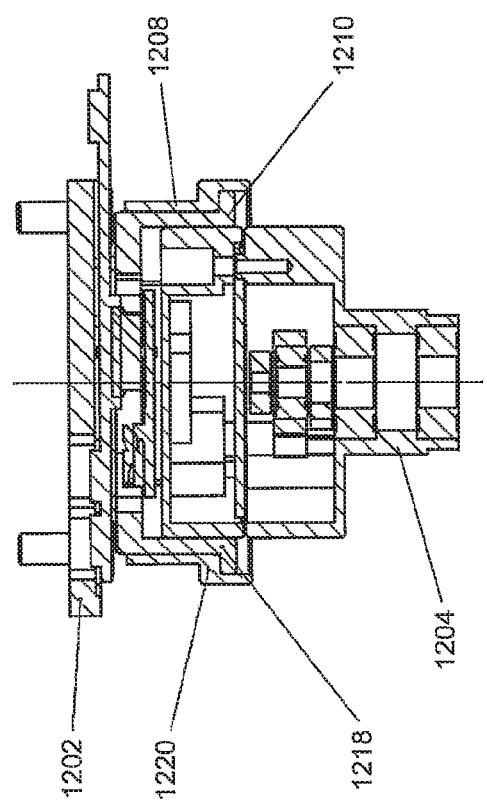
FIG. 12D illustrates a cross-sectional view of the coupling mechanism of FIG. 12C through line F-F, in accordance with embodiments.
Figure 12C:
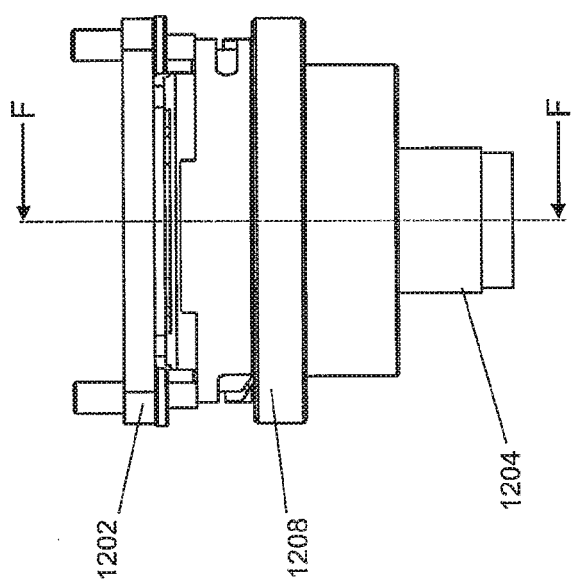
FIG. 12C illustrates a side view of the coupling mechanism of FIGS. 12A and 12B, in accordance with embodiments.

FIGS. 12A-12D illustrate a coupling mechanism 1200 for connecting a mounting platform to a base support, in accordance with embodiments. FIGS. 12A and 12B illustrate exploded perspective views of the coupling mechanism 1200, FIG. 12C illustrates a side view, and FIG. 12D illustrates a cross-sectional view through line F-F. The coupling mechanism 1200 includes a first portion 1202 and a second portion 1204 adapted to releasably couple to each other. The first portion 1202 can be a plate or other component configured to couple to a base support (e.g., via fasteners such as screws 1206) and the second portion 1204 can be situated on a mounting platform (e.g., a mounting assembly), or vice-versa. The first and second portions 1202, 1204 can be coupled to each other via a quick release assembly including a locking ring 1208, adapter 1210, and a pair of locking pins 1212. The first and second portions 1202, 1204 can respectively include first and second electrical connections 1214, 1216 that, when brought into contact with each other by the coupling of the first and second portions 1202, 1204, enable electrical communication between the first and second portions 1202, 1204, thereby electrically coupling the base support and mounting assembly. The electrical connections 1214, 1216 can include any suitable combination of mating electrical components, including pins, contacts, sockets, plugs, and so on.

The locking ring 1208, adapter 1210, and locking pins 1212 can be releasably engaged with each other so as to form a quick release coupling between the first and second portions 1202, 1204. The adapter 1210 can be inserted within the locking ring 1208 so that the external surface of the flange 1218 of the adapter 1210 abuts the internal surface of the shoulder 1220 of the locking ring 1208, thereby coupling the adapter 1210 and the locking ring 1208. The coupling between the adapter 1210 and the locking ring 1208 can be a permanent coupling or a releasable coupling. The first portion 1202 can be secured to the coupled locking ring 1208 and adapter 1210 by one or more fasteners, such as by screws 1222 inserted within corresponding screw holes 1224 situated on the adapter 1210. To couple the first and second portions 1202, 1204, the second portion 1204 can be inserted within the adapter 1210 such that the locking pins 1212 protrude through apertures 1226 on the adapter 1210 and channels 1228 on the locking ring 1208. The coupling mechanism 1200 can include any suitable number of locking pins 1212 and corresponding apertures 1226 and channels 1228, such as two, three, four, or more. The locking ring 1208 can be rotated along a first direction (e.g., clockwise) relative to the first portion 1202, second portion 1204, adapter 1210, and locking pins 1212 so that the locking pins 1212 are secured within the channels 1228, thereby locking the first and second portions 1202, 1204 at a fixed position and orientation relative to each other. To uncouple the first and second portions 1202, 1204, the locking ring 1208 can be rotated in the reverse direction (e.g., counterclockwise), thereby enabling the locking pins 1212 to be disengaged from the apertures 1226 and channel 1228 so as to release the second portion 1202 from within the adapter 1210.

Figure 13A:
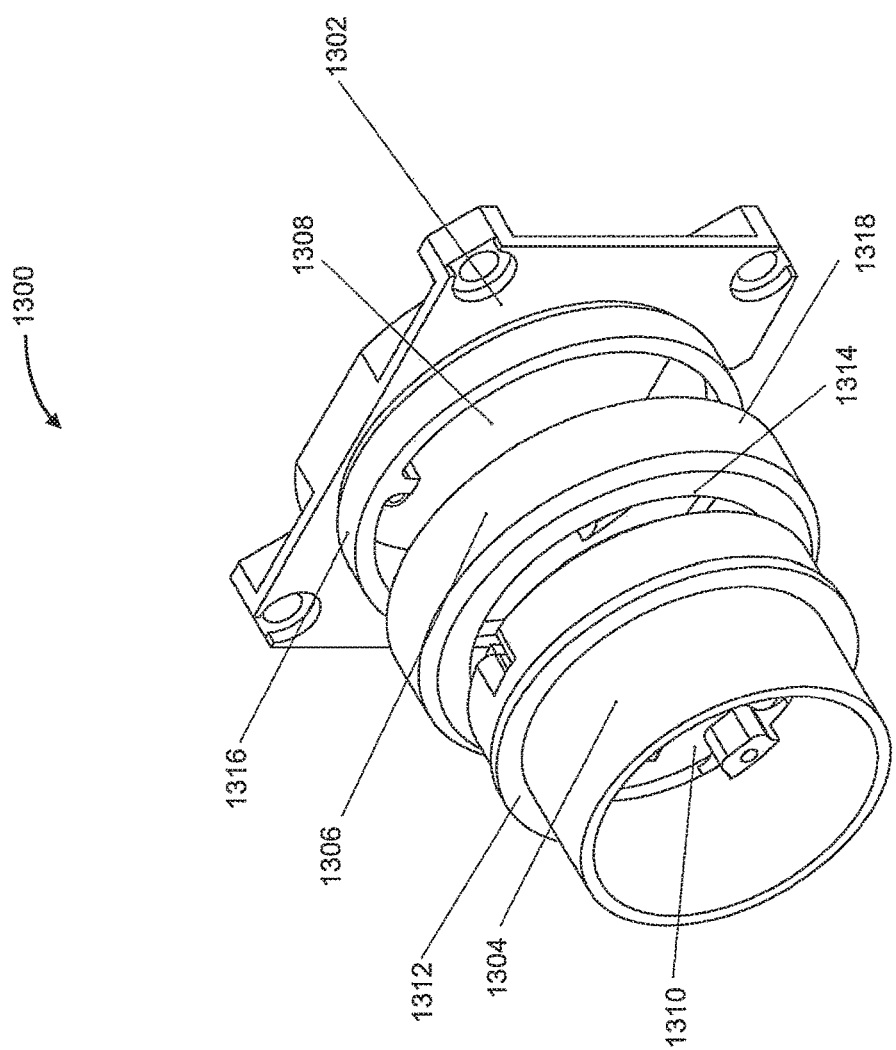
FIG. 13A illustrates an exploded perspective view of a coupling mechanism for connecting a mounting platform to a base support, in accordance with embodiments.

FIGS. 13A-13C illustrates a coupling mechanism 1300 for connecting a mounting platform to a base support, in accordance with embodiments. FIG. 13A illustrates an exploded perspective view of the coupling mechanism 1300, FIG. 13B illustrates a side view, and FIG. 13C illustrates a cross-sectional view through line G-G. Similar to other embodiments provided herein, the coupling mechanism 1300 can include first and second portions 1302, 1304 that can be respectively coupled to a mounting platform and a base support, or vice-versa. The first and second portions 1302, 1304 can be releasably coupled to each other via a quick release coupling using a locking ring 1306. Additionally, the first and second portions 1302, 1304 can respectively include first and second electrical connections 1308, 1310 that, when brought into contact with each other by the coupling of the first and second portions 1302, 1304, enable electrical communication between the first and second portions 1302, 1304, thereby electrically coupling the base support and mounting assembly.

The second portion 1304 can be inserted within the locking ring 1306 such that the external surface of the flange 1312 on the second portion 1304 abuts the internal surface of the shoulder 1314 of the locking ring 1306, thereby coupling the second portion 1302 and the locking ring 1306. The coupling between the second portion 1304 and the locking ring 1306 can be a permanent coupling or a releasable coupling. The coupled locking ring 1306 and second portion 1304 can be releasably coupled to the first portion 1302 using any suitable mechanism. For example, the first portion 1302 can include features 1316 shaped to releasably engage mating features 1318 situated on the locking ring 1306, thereby coupling the first and second portions 1302, 1304 via the locking ring 1306. In some instances, the features 1316 on the first portion 1302 can be male screw threads and the features 1318 on the locking ring 1306 can be female screw threads so that the first and second portions 1302, 1304 can be coupled and coupled by screwing or unscrewing the locking ring 1306, respectively. Conversely, the features 1316 on the first portion 1302 can be female screw threads and the features 1318 on the locking ring 1306 can be male screw threads. Optionally, other types of mating locking features can be used, such as grooves, slots, tabs, protrusions, channels, and the like.

The systems, devices, and methods described herein can be applied to a wide variety of base supports. Some base supports may be movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be a living subject or be carried by a living subject, such as a human or an animal. Suitable animals can include avines, canines, felines, equines, bovines, ovines, porcines, delphines, rodents, or insects.

The movable object may be capable of moving freely within the environment with respect to six axes of freedom (e.g., three axes of freedom in translation and three axes of freedom in rotation). Alternatively, the movement of the movable object can be constrained with respect to one or more axes of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 14:
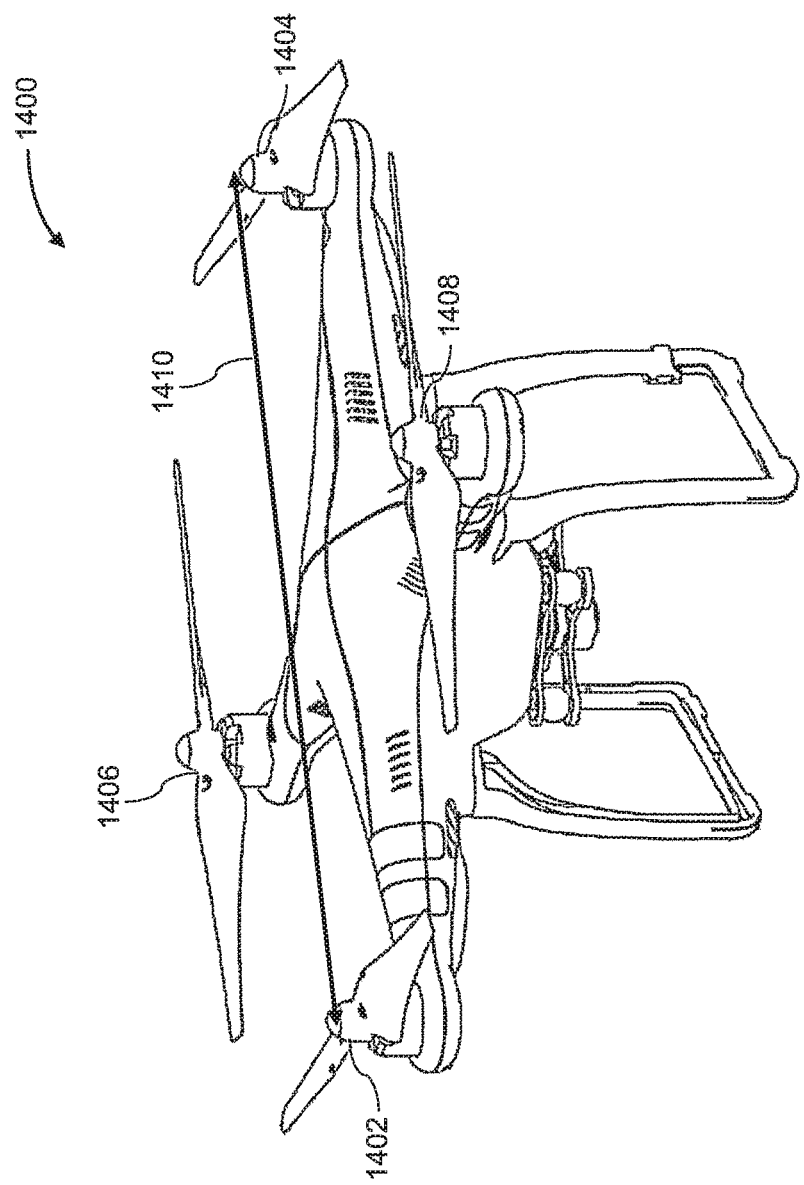
FIG. 14 illustrates an unmanned aerial vehicle, in accordance with embodiments.

FIG. 14 illustrates an unmanned aerial vehicle (UAV) 1400, in accordance with embodiments of the present invention. The UAV may be an example of a movable object as described herein. The UAV 1400 can include a propulsion system having four rotors 1402, 1404, 1406, and 1408. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1410. For example, the length 1410 can be less than or equal to 2 m, or less than equal to 5 m. In some embodiments, the length 1410 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 15:
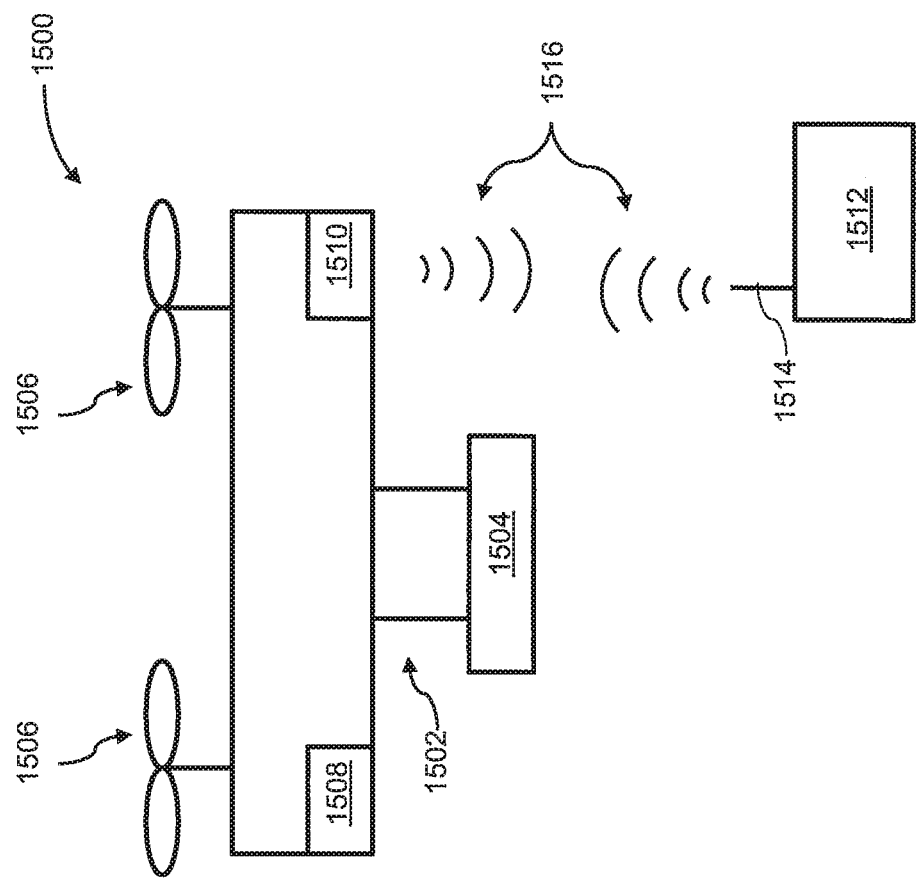
FIG. 15 illustrates a movable object including a carrier and a payload, in accordance with embodiments.

FIG. 15 illustrates a movable object 1500 including a carrier 1502 and a payload 1504, in accordance with embodiments. Although the movable object 1500 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1504 may be provided on the movable object 1500 without requiring the carrier 1502. The movable object 1500 may include propulsion mechanisms 1506, a sensing system 1508, and a communication system 1510.

The propulsion mechanisms 1506 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1506 can be mounted on the movable object 1500 using any suitable means, such as a support element (e.g., a drive shaft) as described elsewhere herein. The propulsion mechanisms 1506 can be mounted on any suitable portion of the movable object 1500, such on the top, bottom, front, back, sides, or suitable combinations thereof.

In some embodiments, the propulsion mechanisms 1506 can enable the movable object 1500 to take off vertically from a surface or land vertically on a surface without requiring any horizontal movement of the movable object 1500 (e.g., without traveling down a runway). Optionally, the propulsion mechanisms 1506 can be operable to permit the movable object 1500 to hover in the air at a specified position and/or orientation. One or more of the propulsion mechanisms 1500 may be controlled independently of the other propulsion mechanisms. Alternatively, the propulsion mechanisms 1500 can be configured to be controlled simultaneously. For example, the movable object 1500 can have multiple horizontally oriented rotors that can provide lift and/or thrust to the movable object. The multiple horizontally oriented rotors can be actuated to provide vertical takeoff, vertical landing, and hovering capabilities to the movable object 1500. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1500 (e.g., with respect to up to three axes of translation and up to three axes of rotation).

The sensing system 1508 can include one or more sensors that may sense the spatial disposition, velocity, and/or acceleration of the movable object 1500 (e.g., with respect to up to three axes of translation and up to three axes of rotation). The one or more sensors can include global positioning system (GPS) sensors, motion sensors, inertial sensors, proximity sensors, or image sensors. The sensing data provided by the sensing system 1508 can be used to control the spatial disposition, velocity, and/or orientation of the movable object 1500 (e.g., using a suitable processing unit and/or control module, as described below). Alternatively, the sensing system 1508 can be used to provide data regarding the environment surrounding the movable object, such as weather conditions, proximity to potential obstacles, location of geographical features, location of manmade structures, and the like.

The communication system 1510 enables communication with terminal 1512 having a communication system 1514 via wireless signals 1516. The communication systems 1510, 1514 may include any number of transmitters, receivers, and/or transceivers suitable for wireless communication. The communication may be one-way communication, such that data can be transmitted in only one direction. For example, one-way communication may involve only the movable object 1500 transmitting data to the terminal 1512, or vice-versa. The data may be transmitted from one or more transmitters of the communication system 1510 to one or more receivers of the communication system 1512, or vice-versa. Alternatively, the communication may be two-way communication, such that data can be transmitted in both directions between the movable object 1500 and the terminal 1512. The two-way communication can involve transmitting data from one or more transmitters of the communication system 1510 to one or more receivers of the communication system 1514, and vice-versa.

In some embodiments, the terminal 1512 can provide control data to one or more of the movable object 1500, carrier 1502, and payload 1504 and receive information from one or more of the movable object 1500, carrier 1502, and payload 1504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1506), or a movement of the payload with respect to the movable object (e.g., via control of the carrier 1502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1508 or of the payload 1504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1512 can be configured to control a state of one or more of the movable object 1500, carrier 1502, or payload 1504. Alternatively or in combination, the carrier 1502 and payload 1504 can also each include a communication module configured to communicate with terminal 1512, such that the terminal can communicate with and control each of the movable object 1500, carrier 1502, and payload 1504 independently.

In some embodiments, the movable object 1500 can be configured to communicate with another remote device in addition to the terminal 1512, or instead of the terminal 1512. The terminal 1512 may also be configured to communicate with another remote device as well as the movable object 1500. For example, the movable object 1500 and/or terminal 1512 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1500, receive data from the movable object 1500, transmit data to the terminal 1512, and/or receive data from the terminal 1512. Optionally, the remote device can be connected to the Internet or other telecommunications network, such that data received from the movable object 1500 and/or terminal 1512 can be uploaded to a website or server.

Figure 16:
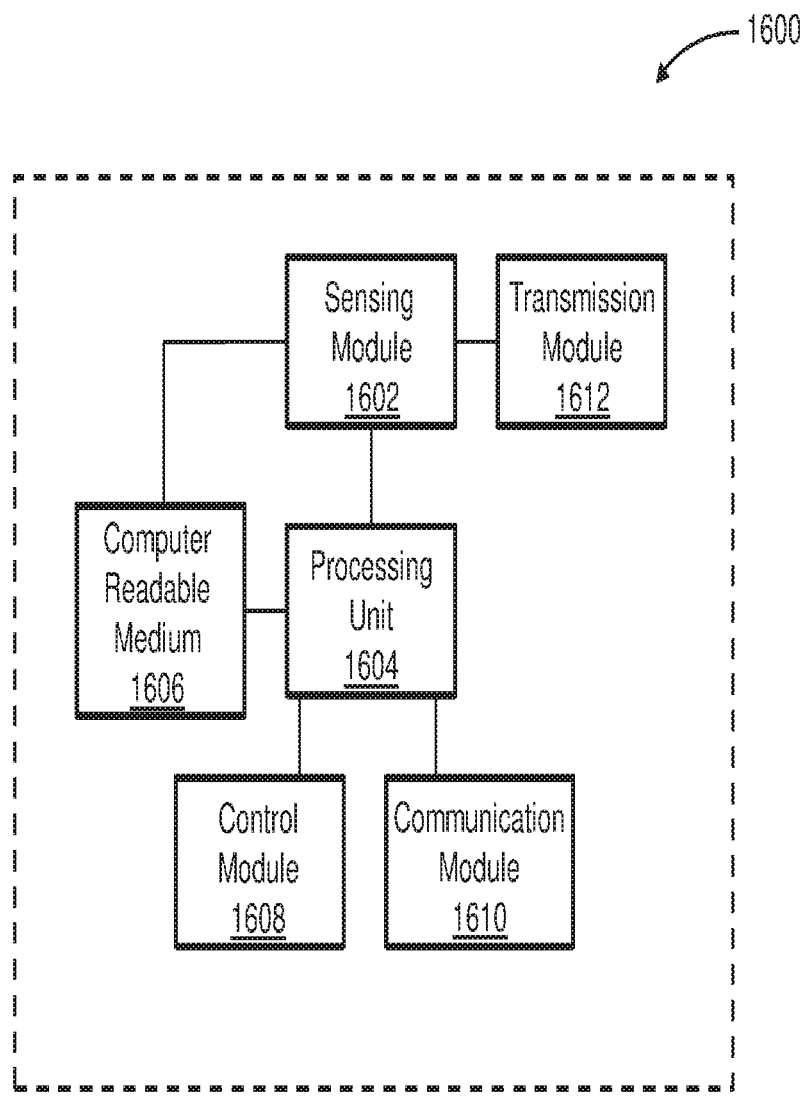
FIG. 16 is a schematic illustration by way of block diagram of a system for controlling a movable object, in accordance with embodiments.

FIG. 16 is a schematic illustration by way of block diagram of a system 1600 for controlling a movable object, in accordance with embodiments. The system 1600 can be used in combination with any suitable embodiment of the systems, devices, and methods disclosed herein. The system 1600 can include a sensing module 1602, processing unit 1604, non-transitory computer readable medium 1606, control module 1608, and communication module 1610.

The sensing module 1602 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1602 can be operatively coupled to a processing unit 1604 having a plurality of processors. In some embodiments, the sensing module can be operatively coupled to a transmission module 1612 (e.g., a Wi-Fi image transmission module) configured to directly transmit sensing data to a suitable external device or system. For example, the transmission module 1612 can be used to transmit images captured by a camera of the sensing module 1602 to a remote terminal.

The processing unit 1604 can have one or more processors, such as a programmable processor (e.g., a central processing unit (CPU)). The processing unit 1604 can be operatively coupled to a non-transitory computer readable medium 1606. The non-transitory computer readable medium 1606 can store logic, code, and/or program instructions executable by the processing unit 1604 for performing one or more steps. The non-transitory computer readable medium can include one or more memory units (e.g., removable media or external storage such as an SD card or random access memory (RAM)). In some embodiments, data from the sensing module 1602 can be directly conveyed to and stored within the memory units of the non-transitory computer readable medium 1606. The memory units of the non-transitory computer readable medium 1606 can store logic, code and/or program instructions executable by the processing unit 1604 to perform any suitable embodiment of the methods described herein. For example, the processing unit 1604 can be configured to execute instructions causing one or more processors of the processing unit 1604 to analyze sensing data produced by the sensing module. The memory units can store sensing data from the sensing module to be processed by the processing unit 1604. In some embodiments, the memory units of the non-transitory computer readable medium 1606 can be used to store the processing results produced by the processing unit 1604.

In some embodiments, the processing unit 1604 can be operatively coupled to a control module 1608 configured to control a state of the movable object. For example, the control module 1608 can be configured to control the propulsion mechanisms of the movable object to adjust the spatial disposition, velocity, and/or acceleration of the movable object with respect to six axes of freedom. Alternatively or in combination, the control module 1608 can control one or more of a state of a carrier, payload, or sensing module.

The processing unit 1604 can be operatively coupled to a communication module 1610 configured to transmit and/or receive data from one or more external devices (e.g., a terminal, display device, or other remote controller). Any suitable means of communication can be used, such as wired communication or wireless communication. For example, the communication module 1610 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1610 can transmit and/or receive one or more of sensing data from the sensing module 1602, processing results produced by the processing unit 1604, predetermined control data, user commands from a terminal or remote controller, and the like.

The components of the system 1600 can be arranged in any suitable configuration. For example, one or more of the components of the system 1600 can be located on the movable object, carrier, payload, terminal, sensing system, or an additional external device in communication with one or more of the above. Additionally, although FIG. 16 depicts a single processing unit 1604 and a single non-transitory computer readable medium 1606, one of skill in the art would appreciate that this is not intended to be limiting, and that the system 1600 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1600 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An assembly for interchangeably mounting onto a plurality of different types of base support comprising a first type of base support and a second type of base support, wherein the first type of base support is an unmanned aerial vehicle (UAV) and the second type of base support is a handheld support member, the assembly configured for both aerial imaging and handheld photography comprising:
   a payload configured to obtain image data, wherein the payload comprises or is operably coupled to a transmitter for transmitting the image data to a terminal, wherein said terminal is provided separately from the payload or located remotely to the payload; and
   a mounting platform coupled to the payload via a first coupling, wherein the mounting platform comprises one or more sensors configured to obtain sensing data indicative of a spatial disposition of the mounting platform or the payload, wherein said sensing data is transmitted to the terminal, and wherein said mounting platform is configured to be releasably coupled via a second coupling to each of the first type and the second type of base support, and wherein the second coupling is a quick release coupling such that the quick release (1) is carried out manually without the use of tools and (2) enables the first type of base support and the second type of base support to be releasably coupled to and decoupled from the mounting platform,
   wherein the mounting platform is configured to establish electrical communication with each of the first type of base support and the second type of base support separately, such that (1) the electrical communication is established with the first type of base support when the mounting platform is coupled to the first type of base support via the second coupling and is receiving power from a first power source on the first type of base support, and (2) the electrical communication is established with the second type of base support when the mounting platform is coupled to the second type of base support via the second coupling and is receiving power from a second power source on the second type of base support;
   wherein the electrical communication is configured to initiate a recognition of whether the mounting platform is coupled to the UAV or to the handheld support member;
   wherein the mounting platform is configured to control the spatial disposition of the payload relative to each of the first type of base support and the second type of base support based on the sensing data; and
   when the mounting platform is coupled to the UAV and upon establishing the electrical communication between the mounting platform and the UAV, a first set of control signals is obtained by the mounting platform to control the spatial disposition of the payload relative to the UAV; and
   when the mounting platform is coupled to the handheld support member and upon establishing the electrical communication between the mounting platform and the handheld support member, a second set of control signals is obtained by the mounting platform to control the spatial disposition of the payload relative to the handheld support member.

2. The assembly of claim 1, wherein the payload is an imaging device comprising a storage medium.

3. The assembly of claim 1, wherein the first set of control signals is obtained by the mounting platform to control the spatial disposition of the payload about one or two of a roll axis, a pitch axis, or a yaw axis with respect to the UAV; and wherein the second set of control signals is obtained by the mounting platform to control the spatial disposition of the payload about a roll axis, a pitch axis, or a yaw axis with respect to the handheld support member.

4. The assembly of claim 2, wherein the mounting platform comprises at least one actuator configured to rotate the payload, and wherein the imaging device is stabilized by the at least one actuator.

5. The assembly of claim 1, wherein the transmitter wirelessly transmits said image data to said terminal.

6. The assembly of claim 5, wherein the terminal comprises a display configured to be coupled to the handheld support member via a mating interface of the handheld support member.

7. The assembly of claim 1, wherein the handheld support member comprises an input interface configured to receive input from a user, wherein the input comprises commands provided to the handheld support member to effect control of the spatial disposition of the payload via the mounting platform.

8. The assembly of claim 7, wherein the spatial disposition of the payload comprises an orientation of the payload relative to the handheld support member.

9. The assembly of claim 7, wherein said transmitter is configured to wirelessly transmit the image data to the handheld support member.

10. The assembly of claim 6, wherein the display displays information indicating the type of the base support to which the mounting platform is attached.

11. The assembly of claim 9, wherein the payload is stabilized and comprises a storage medium.

12. The assembly of claim 1, wherein the first power source is located onboard the UAV, and the second power source is located on the handheld support member.

13. The assembly of claim 12, wherein the first power source is configured to provide power to one or more propulsion units of the UAV.

14. A method for interchangeably mounting onto a plurality of different types of base support comprising a first type of base support and a second type of base support to enable aerial imaging and handheld photography, wherein the first type of base support is an unmanned aerial vehicle (UAV) and the second type of base support is a handheld support member, the method comprising:
providing a mounting platform coupled to a payload via a first coupling, wherein the mounting platform comprises one or more sensors configured to obtain sensing data indicative of a spatial disposition of the mounting platform or the payload, wherein the payload is configured to obtain image data and comprises or is operably coupled to a transmitter for transmitting the image data to a terminal, and wherein the terminal is provided separately from the payload or located remotely to the payload and configured to receive the image data and the sensing data;
releasably coupling the mounting platform via a second coupling to each of the first type and the second type of base support, wherein the second coupling is a quick release coupling such that the quick release (1) is carried out manually without the use of tools and (2) enables the first type of base support and the second type of base support to be releasably coupled to and decoupled from the mounting platform;
establishing electrical communication between the mounting platform and each of the first type of base support and second type of base support separately such that (1) the electrical communication is established with the first type of base support when the mounting platform is coupled to the first type of base support via the second coupling and is receiving power from a first power source on the first type of base support, and (2) the electrical communication is established with the second type of base support when the mounting platform is coupled to the second type of base support via the second coupling and is receiving power from a second power source on the second type of base support;
initiating a recognition of whether the mounting platform is coupled to the UAV or to the handheld support member;
controlling, with aid of the mounting platform, the spatial disposition of the payload relative to each of the first type of base support and the second type of base support based on the sensing data;
obtaining, by the mounting platform, a first set of control signals to control the spatial disposition of the payload relative to the UAV when the mounting platform is coupled to the UAV and upon establishing the electrical communication between the mounting platform and the UAV; and
obtaining, by the mounting platform, a second set of control signals to control the spatial disposition of the payload relative to the handheld support member when the mounting platform is coupled to the handheld support member and upon establishing the electrical communication between the mounting platform and the handheld support member.

15. The assembly of claim 1, wherein the quick release coupling enables at least the sensing data from the mounting platform to be conveyed to (1) the first type of base support when the mounting platform is coupled to the first type of base support, and (2) to the second type of base support when the mounting platform is coupled to the second type of base support.

16. The assembly of claim 15, wherein the sensing data from the mounting platform comprises data about a state of the mounting platform or the payload.

17. The assembly of claim 1, wherein an indication of whether the mounting platform is coupled to the first type of base support or the second type of base support is shown on a display of the terminal.

18. The assembly of claim 1, further comprising: a base adapter that is configured to support the mounting platform and that is configured to be releasably coupled via the second coupling to each of the first type and the second type of base support, wherein the base adapter comprises one or more vibration dampers.

19. The assembly of claim 18, wherein the base adapter is configured to communicate at least one of power and data to the mounting platform or the payload.

20. The assembly of claim 1, wherein the mounting assembly is configured to effect the control of the spatial disposition of the payload based on input from a user (1) via the terminal that is provided separate from the first type of base support, when the mounting platform is coupled to the first type of base support, and (2) via an input interface on the second type of base support, when the mounting platform is coupled to the second type of base support.

21. The assembly of claim 1, wherein the first set of control signals is obtained to control the spatial disposition of the payload such that movement of the payload relative to the UAV is constrained about at least one of a roll axis, a pitch axis, or a yaw axis with respect to the UAV; and wherein the second set of control signals is obtained to control the spatial disposition of the payload such that movement of the payload relative to the handheld support member is constrained about at least one of a roll axis, a pitch axis, or a yaw axis with respect to the handheld support member.

* * * * *